(12) United States Patent
Cavina et al.

(10) Patent No.: US 8,235,703 B2
(45) Date of Patent: Aug. 7, 2012

(54) APPARATUS FOR TRANSFERRING DOSES

(75) Inventors: Giambattista Cavina, Faenza (IT);
Fiorenzo Parrinello, Medicina (IT);
Zeno Zuffa, Borgo Tossignano (IT)

(73) Assignee: Sacmi Cooperativa Meccanici Imola Societa' Cooperativa (IT)

( * ) Notice: Subject to any disclaimer, the term of this patent is extended or adjusted under 35 U.S.C. 154(b) by 329 days.

(21) Appl. No.: 12/527,458

(22) PCT Filed: Feb. 8, 2008

(86) PCT No.: PCT/IB2008/000293
§ 371 (c)(1),
(2), (4) Date: Oct. 29, 2009

(87) PCT Pub. No.: WO2008/102224
PCT Pub. Date: Aug. 28, 2008

(65) Prior Publication Data
US 2010/0112110 A1 May 6, 2010

(30) Foreign Application Priority Data
Feb. 23, 2007 (IT) .............................. MO2007A0057
May 25, 2007 (IT) .............................. MO2007A0181

(51) Int. Cl.
*B28B 3/00* (2006.01)

(52) U.S. Cl. .......................... 425/412; 425/447; 425/449
(58) Field of Classification Search .................. 425/412, 425/447, 449; 264/148; 65/122, 207
See application file for complete search history.

(56) References Cited

U.S. PATENT DOCUMENTS

| | | | | |
|---|---|---|---|---|
| 3,753,633 A | * | 8/1973 | Van Kralingen | 425/71 |
| 4,296,061 A | * | 10/1981 | Buckingham | 264/138 |
| 4,793,847 A | * | 12/1988 | Kawachi et al. | 65/225 |
| 4,834,832 A | * | 5/1989 | Stock et al. | 117/16 |
| 5,009,825 A | * | 4/1991 | Lurie | 264/148 |

FOREIGN PATENT DOCUMENTS

| | | |
|---|---|---|
| WO | 2005/102646 A1 | 11/2005 |
| WO | 2006/109108 A1 | 10/2006 |

* cited by examiner

*Primary Examiner* — Maria Veronica Ewald
(74) *Attorney, Agent, or Firm* — Laubscher & Laubscher, P.C.

(57) ABSTRACT

An apparatus for transferring doses includes a forming arrangement for forming an object from a dose of flowable material and a transferring arrangement for transferring the dose to the forming arrangement. The transferring arrangement has a recess for receiving the dose. The recess is provided with a rolling arrangement for guiding the dose inside the transferring arrangement.

93 Claims, 33 Drawing Sheets

APPARATUS FOR TRANSFERRING DOSES

This application is a national phase of PCT International Application No. PCT/IB2008/000293 filed Feb. 8, 2008. PCT/IB2008/000293 claims priority to IT Application No. MO2007A000057 filed Feb. 23, 2007 and IT Application No. MO2007A000181 filed May 25, 2007. The entire contents of these applications are incorporated herein by reference.

The invention relates to an apparatus for transferring a dose of plastics to a forming device for forming a preform from which it is possible to obtain a container, in particular a bottle. Apparatuses are known for compression-moulding objects made of plastics, for example preforms for bottles, comprising a rotating moulding carousel that carries a plurality of moulds each comprising a die and a punch. During rotation, each dies receives a dose of plastics in a pasty state. The dose is pressed between the die and the corresponding punch along a circumference arc along which the moulding carousel travels. The pressing step is followed by opening of the mould and extraction of the moulded object from the apparatus.

Each dose is obtained by cutting plastics into the shape of a continuous extruded product exiting an extruding or plasticisation device. The apparatus further comprises a transferring carousel having a plurality of transferring units that successively remove the doses that have just been cut and transfer the doses to the moulding carousel.

Each transferring unit comprises an upper element having a "U" or "C" or "J"-shaped cross-section so as to define a channel that is open on a side, i.e. provided with a removal opening, and a lower element of tubular shape, defining a transferring chamber communicating with the open channel and having an openable bottom.

The doses removed through the removal opening fall by gravity into the transferring chamber and are deposited by the transferring chamber, when the bottom is opened, inside the die, whilst the die is below the transferring unit.

The plastics that constitute the doses tend to adhere to the surfaces with which they come into contact due to the pasty state of the plastics.

In particular, as the doses, whilst they pass through the aforesaid components, slide on the internal surface of the transferring unit, the doses may move in a manner that is not easily controllable.

In order to control as well as possible the passage of the doses through the transferring unit—in particular in order to obtain times for passing through the transferring chamber that are certain and repeatable—the temperature of the transferring unit, particularly of the transferring chamber, is adjusted, and/or the degree of humidity of both the plastics and of the environment (microclimate) in which the transferring carousel is installed is controlled and/or suitable surface finishes are made on the walls that bound the transferring unit internally (in particular obtaining rough walls provided with grooves having a preset orientation) and/or surface coatings are provided on the aforesaid walls, particularly of self-cleaning material (water-repellent surfaces, i.e. surfaces having great repellence to plastics).

A drawback of known transferring carousels consists of the fact that it is very difficult to keep the internal walls of the transferring units clean. Such internal walls, in fact, tend to be dirtied by the residues of plastics generated by the sliding of the doses on the internal walls. This drawback is particularly significant if not insignificant quantities of additives such as dyes have been added to the plastics that form the doses, in particular dyes containing, for example waxes, vaseline, etc.

The residues deposited on the aforesaid internal walls progressively alter the transferring speed of the doses, until situations are reached that are limiting for the operating process. If this speed does not fall within preset intervals the doses are not inserted, either completely or partially, inside the mould within the correct time and in the correct manner.

A further drawback of known transferring carousels is that the roughness of the internal walls of the transferring units may be affected by the interaction with the doses (wear from pitting).

As roughness is reduced (i.e. in the case of surfaces that are smoothed and tend to be polished) the doses tend to adhere more to the internal walls, both through the effect of the more extensive contact surfaces between the doses and the internal walls and through the absence of separating air between the doses and the internal walls. In the rough walls, in fact, microchannels are defined inside which there is air that facilitates movement of the doses.

Further, the dose can tilt inside the transferring unit in an undesired manner and subsequently not be positioned inside the cavity of the die correctly, for example by adhering to the walls of the cavity before reaching the bottom thereof. This produces a non-uniform distribution of the plastics in the die, which may cause defects in the preform and thus in the bottle.

If the dose is tilted inside the transferring unit, blows may occur between the dose and the internal surface of the unit, which slows the dose whilst the dose falls towards the cavity of the die. Further, the blows between the dose and the internal surface of, the transferring unit may alter the surface quality of the dose, causing folds and deformations of the most external layers thereof.

An object of the invention is to improve the apparatuses for transferring doses of flowable material, particularly in compression-moulding of plastics.

A further object of the invention is to provide an apparatus for transferring doses of flowable material that is constructionally simple and reliable.

Another object is to provide an apparatus comprising a transferring arrangement for transferring doses of flowable material to a forming arrangement, in which the doses move easily and quickly inside the transferring arrangement and/or the forming arrangement.

According to the invention, there is provided an apparatus comprising a forming arrangement for forming an object from a dose of flowable material and a transferring arrangement for transferring the dose to the forming arrangement, the transferring arrangement having a recess for receiving the dose, wherein in the recess there is provided a rolling arrangement for guiding the dose inside the transferring arrangement.

The rolling arrangement enables the dose that is inside the recess to be guided in a precise manner, which reduces the risk that the dose is tilted considerably while it is conveyed by the transferring arrangement. In this way the blows between the dose and the internal surface of the transferring arrangement and the sliding of the dose on the internal surface of the transferring arrangement decrease. The dose is kept almost aligned along a desired direction and can be introduced more easily into the forming arrangement.

The contact between the dose and the transferring arrangement occurs on limited areas of the rolling arrangement in which rolling friction develops. Owing to this, the dose can move inside the transferring arrangement at a relatively high speed.

In an embodiment, the rolling arrangement is positioned so as to interact successively with an intermediate portion of the dose and with a "tail" portion of the dose, while a "head" portion of the dose starts (and continues) to penetrate inside the forming arrangement. This enables the entry of the dose into the forming arrangement to be guided and the dose to be positioned correctly with respect to the forming arrangement.

The guiding and positioning functions are more effective the shorter the distance of the rolling arrangement from the forming arrangement.

The rolling arrangement may comprise a plurality of rolling elements arranged at gradually increasing distances from an outlet opening through which the doses exit the transferring arrangement to enter the forming arrangement so as to further improve the aforesaid guiding and positioning functions.

In another embodiment, the rolling arrangement is positioned near an inlet opening through which the doses enter the transferring arrangement. This enables the sliding of the doses with respect to the transferring arrangement to be limited at the moment of the first interaction of the doses with the transferring arrangement.

The rolling arrangement may comprise a plurality of rolling elements arranged angularly and axially at the points in which a first contact between the doses and the transferring arrangement is located.

The rolling arrangement, for example rollers, are easily procurable, reliable and inexpensive mechanical components.

The rolling arrangement enables the dose to be ejected from a tubular portion of the recess as soon as closing elements, with which the transferring arrangement is provided, is removed by an ejecting opening of the tubular portion of the recess, so as to enable the dose to pass through the ejecting opening. In other words, the dose exits the opening of the tubular portion of the recess with significant reactivity.

Owing to the rolling arrangement, therefore, when the closing elements take on an open configuration, the dose is ejected from the tubular portion of the recess much faster than occurs in known apparatuses in which the dose tends to adhere to the internal walls of the transferring chamber and to exit the transferring chamber after a certain delay. Possible small jets of pressurized fluid, for example compressed air, may further contribute to expedite the ejection of the doses from the tubular portion of the recess.

The invention can be better understood and implemented with reference to the attached drawings, which illustrate some embodiments thereof by way of non-limiting example, in which.

Figure 1:
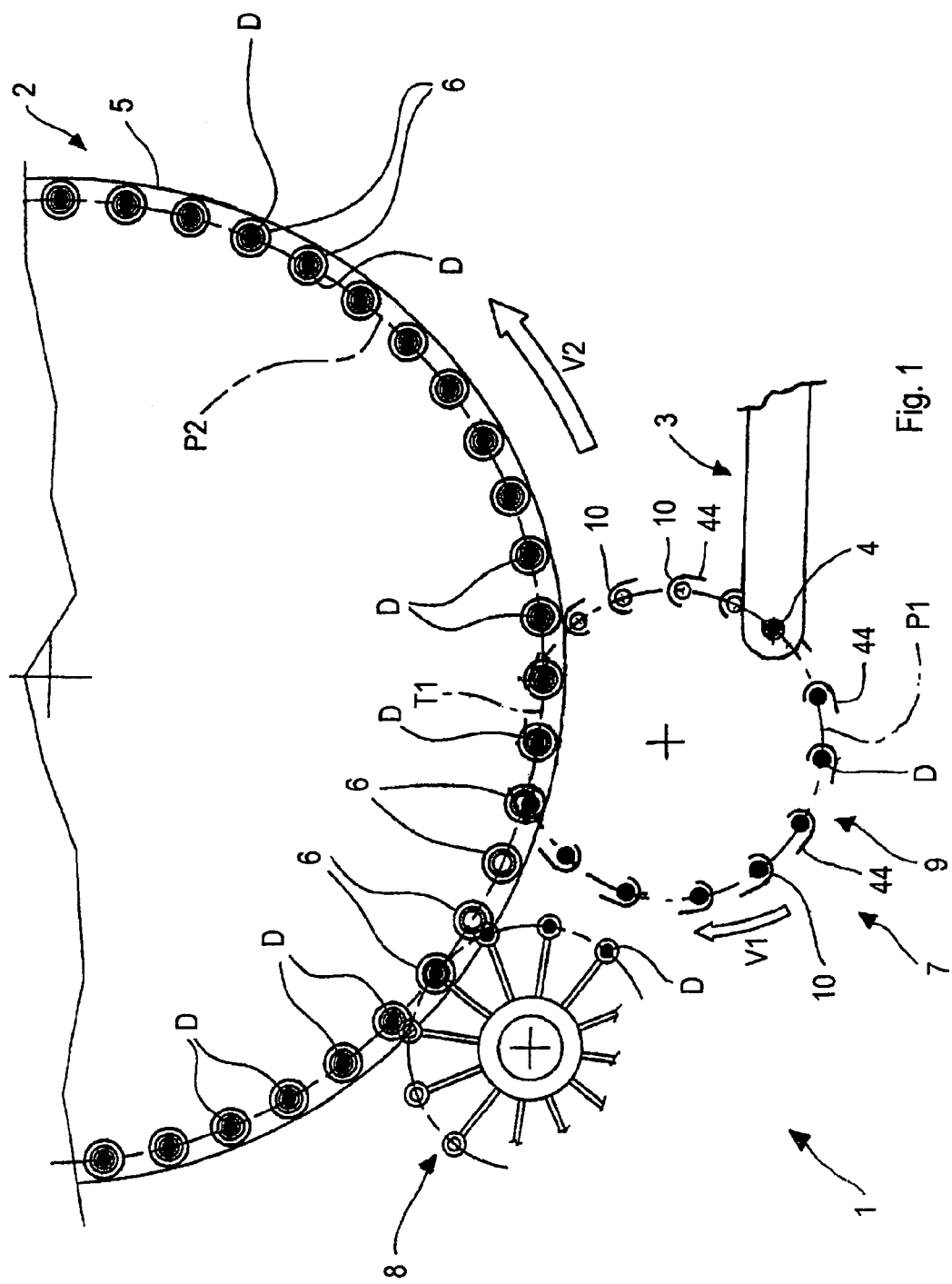
FIG. 1 is a schematic plan view of an apparatus comprising a transferring device for transferring doses of plastics to a forming arrangement.

With reference to FIG. 1, there is shown an apparatus 1 comprising a transferring device 7 for transferring doses D of plastics to a forming arrangement comprising a molding device 2 for forming preforms. From the preforms it is possible to obtain containers, for example bottles, by stretch-blowing.

The doses D can be made of various types of plastics, for example polyethylene terephthalate (PET), polypropylene (PP), polyvinyl chloride (PVC), high density polyethylene (HDPE), polyethylene naphthalate (PEN), polystyrene (PS), polylactic acid (PLA).

In order to obtain the preforms, the doses D have an elongated shape and normally have an approximately circular cross section. It is nevertheless possible, in principle, to use also doses with a different shape, if it is desired to compression-mould objects other than preforms.

The doses D are dispensed by a dispensing device 3 comprising an extruder of plastics, provided with a port 4 from which plastics in pasty state exit. The port 4 may face downwards, so that the plastics exit the extruder along a vertical extrusion direction.

A cutting device is provided that is not shown for cutting the plastics leaving the port 4 so as to define the doses D.

The moulding device 2 comprises a carousel 5 that is rotatable around a substantially vertical axis, according to the direction V2 shown in FIG. 1, and supporting a plurality of moulds each comprising a die 6, i.e. a part of a female mould, and a punch, i.e. a part of a male die, which is not shown. Each die 6 comprises a cavity with a substantially cylindrical shape, suitable for interacting with the corresponding punch for compression-moulding, during a moulding step, the dose D previously received in the cavity of the die.

Alternatively, the dies 6 may comprise cavities having shapes other than a cylindrical shape, for example cavities with a conical shape. This is, for example, if the cavities have to form preforms from which containers of the "wide mouth" type have to be obtained to be used, prevalently, for containing foods.

The apparatus 1 further comprises an extracting device 8 for removing the preforms from the corresponding moulds and carrying away the preforms from the moulding device 2. In an embodiment that is not shown, the apparatus may be devoid of the extracting device 8 and the preforms may be removed from the moulding device 2 by the same transferring device 7 that delivers the doses D to the dies 6.

The transferring device 7 is arranged for transferring the doses D from the port 4 to the cavities of the dies 6. The transferring device 7 comprises a further carousel 9 that is rotatable around a vertical axis, according to the direction V1 shown in FIGS. 1, and supporting a transferring arrangement including a plurality of transferring units 10 that are movable in a substantially continuous manner along a closed-loop path P1.

The closed-loop path P1 is at a higher level than a circular path P2 along which the dies 6 and the corresponding punches move. It is possible to define a portion T1 in which the closed-loop path P1 substantially coincides with the circular path P2. Along the portion T1 the transferring units 10 are moved substantially at the same speed as the dies 6 so that each transferring unit 10 is above a die cavity whilst it is moved along the portion T1.

Figure 2:
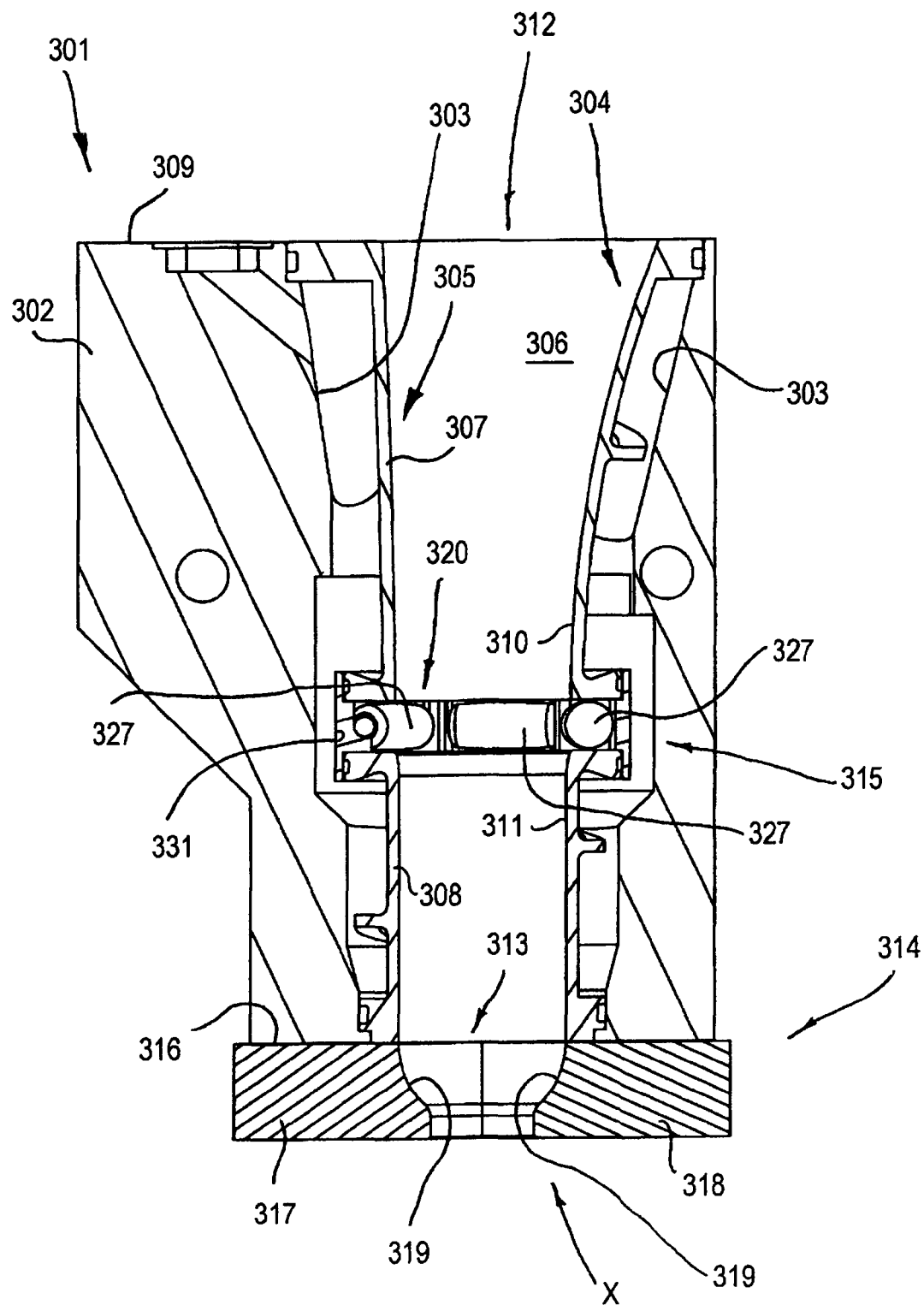
FIG. 2 is a section taken along a longitudinal plane of an embodiment of a lower element of a transferring unit included in the transferring device in FIG. 1.
Figure 16:
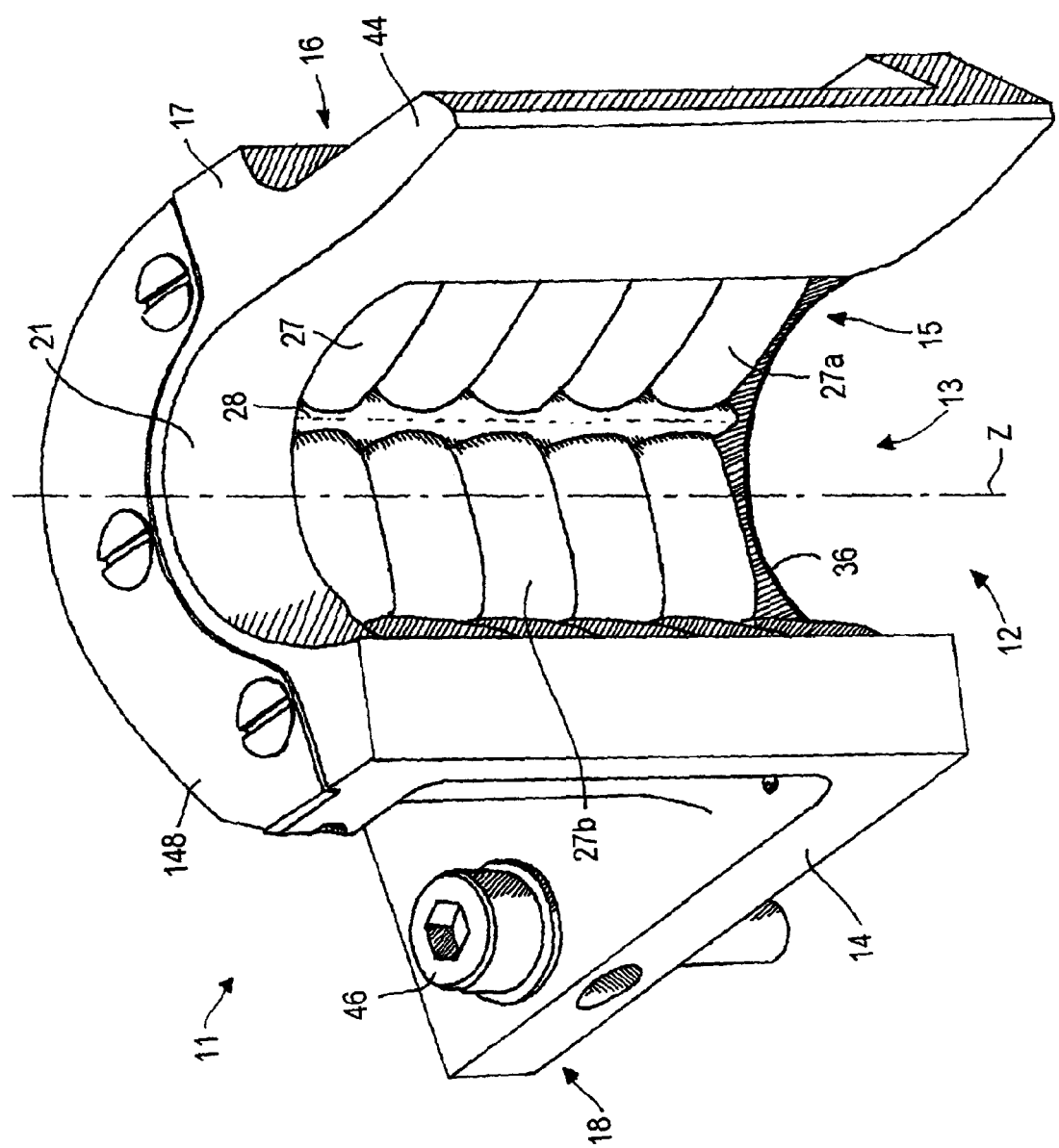
FIG. 16 is a perspective top view of an embodiment of an upper element of a transferring unit included in the transferring device in FIG. 1.

Each transferring unit 10 comprises an upper element 11, for example of the type shown in FIG. 16, and a lower element, for example a lower element 301 of the type shown in FIG. 2, that can be fixed with respect to the upper element 11.

The upper element 11 has a "U" or "C" or "J"-shaped cross section so as to define an open channel on a side that extends along a longitudinal axis Z. Inside the upper element 11 there is defined a recess 13. A lateral opening 12, obtained parallel to the longitudinal axis Z, enables the recess 13 to be accessed.

The upper element 11 removes, from near the port 4 of the extruder, a dose D that has just been cut by the cutting device. The dose D is housed in the recess 13, inside which the dose D drops by gravity to the lower element.

The lower element has a substantially tubular shape, being bound by a continuous surface extending around the longitudinal axis Z. Inside the lower element there is defined a transferring chamber for, housing the dose D whilst the corresponding transferring unit 10 moves along the closed path P1. The dose D enters the transferring chamber by an inlet opening that extends on a plane that is transverse to the longitudinal axis Z. At an upper end thereof, the transferring chamber may have a cross section with a shape and dimensions that substantially coincide with those of the open channel. Discontinuity in the passage from the upper element to the transferring chamber is thus avoided.

The lower element is further provided with an outlet opening through which the dose D can leave the transferring chamber to be introduced into the cavity of the die 6.

With reference to FIGS. 2 to 7, there is shown an embodiment of a lower element 301 comprising a supporting block 302 that is connectable to the further carousel 9 and provided with a seat 303 inside which there is housed a tubular element arrangement 304. The tubular element arrangement 304 is peripherally bounded by a continuous wall arrangement 305 that defines a transferring chamber 306 shaped as a tubular recess.

Each transferring unit 10 is thus provided with a recess comprising a laterally open portion, i.e. the recess 13, and a tubular portion, i.e. the transferring chamber 306.

The transferring chamber 306 is arranged for receiving a dose D, retaining the dose D and delivering the dose D to a die 6.

An upper element can be fixed to an end zone 309 of the supporting block 302, for example an upper element of the type shown in FIGS. 16 to 24 that cooperates with the lower element 301 to define a transferring unit 10.

The tubular element arrangement 304 comprises a first tubular element 307 and a second tubular element 308 arranged next to one another along the longitudinal axis Z, the second tubular element 308 being further from the end zone 309 than the first tubular element 307.

The continuous wall arrangement 305 comprises a first continuous wall 310 defined in the first tubular element 307 and a second continuous wall 311 defined in the second tubular element 308.

The tubular element arrangement 304 has a first portion shaped substantially as an upturned truncated cone, i.e. a first portion having a cross section that decreases further away from the end zone 309, and a second portion shaped substantially like a cylinder, i.e. a second portion having a substantially constant cross section. In particular, the first tubular element 306 can have a conical shape, so as to define the aforesaid first portion of the tubular element arrangement 304, and the second tubular element 307 may have a cylindrical shape, so as to define the aforesaid second portion of the tubular element arrangement 304.

The tubular element arrangement 304 comprises an inlet opening 312 through which a dose D is received in the transferring chamber 306 and an outlet opening 313 through which the dose D exits the transferring chamber 306.

The inlet opening 312 is defined in the first tubular element 307.

The outlet opening 313 is defined in the second tubular element 308.

The lower element 301 further comprises a closing arrangement 314 associated with a further end zone 316 of the supporting block 302.

The closing arrangement 314 comprises a first closing element 317 and a second closing element 318 that are movable between a closed configuration X, shown in FIG. 2, in which the first closing element 317 and the second closing element 318 prevent the dose D from passing through the outlet opening 313 to exit the transferring chamber 306, and an open configuration, that is not shown, in which the first closing element 317 and the second closing element 318 enable the dose D passing through the outlet opening 313 to exit the transferring chamber 306.

The lower element 301 further comprises a driving device, which is not shown, arranged for moving the first closing element 317 and the second closing element 318 from the closed configuration X to the open configuration, and vice versa.

The first closing element 317 and the second closing element 318 comprise internal wall portions 319 having a profile such as to shape a tip zone of a dose D contained in the transferring chamber 306.

With the tubular element arrangement 304 there is associated a rolling arrangement 315 arranged for interacting with the doses D so as to promote the passage of the doses D through the transferring chamber 306 and the insertion of the doses into the dies 6.

Owing to the rolling arrangement 315, during operation, the doses D penetrate inside the tubular element arrangement 304 and exit the tubular element arrangement 304—after the first closing element 317 and the second closing element 318 have taken on the open configuration—very rapidly.

The rolling arrangement 315, in fact, noticeably reduces the risk of the doses D adhering to the tubular element arrangement 304 inasmuch as the external surfaces of the doses are spaced apart from the internal walls of the tubular element arrangement 304.

The rolling arrangement 315 comprises a plurality of rollers 327.

The rolling arrangement 315 further comprises a supporting element 320 arranged for supporting the rollers 327.

The rollers 327 have rotation axes that lie on a plane arranged transversely, in particular arranged substantially perpendicularly—to the longitudinal axis Z.

Figure 3:
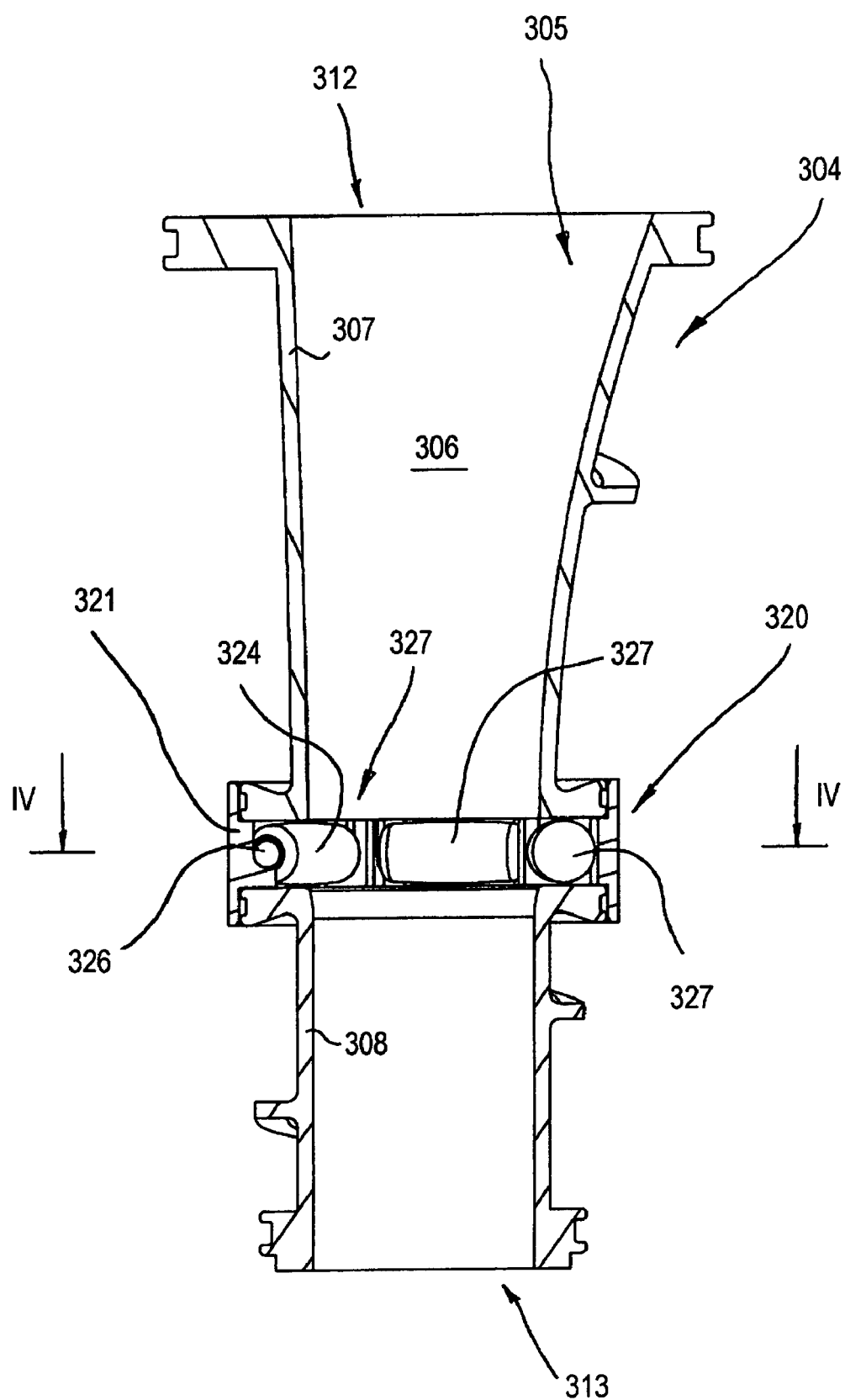
FIG. 3 is a detail of FIG. 2.
Figure 4:
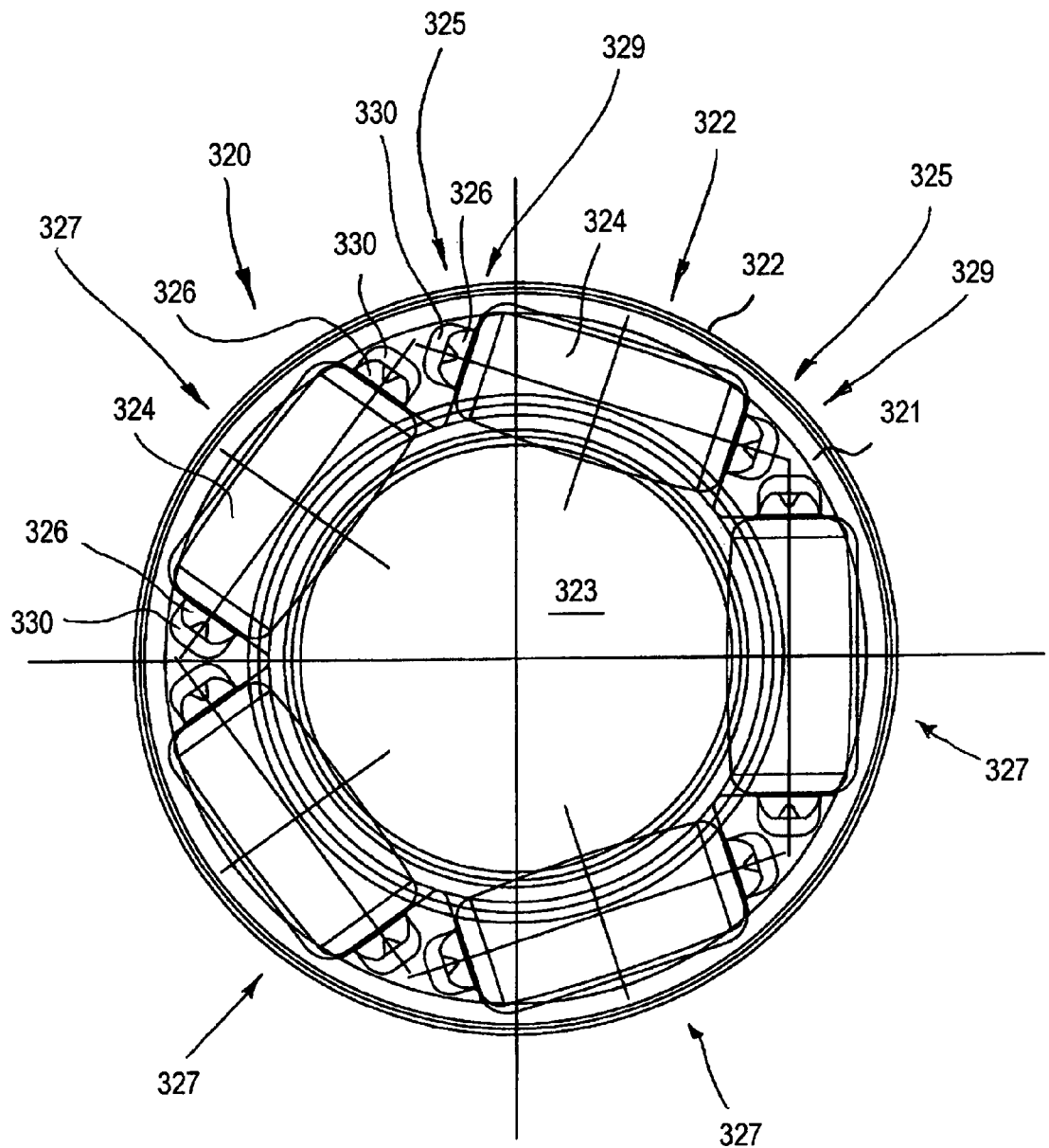
FIG. 4 is a section taken along a plane IV-IV in FIG. 3, showing a supporting body with which rolling elements are associated.
Figure 5:
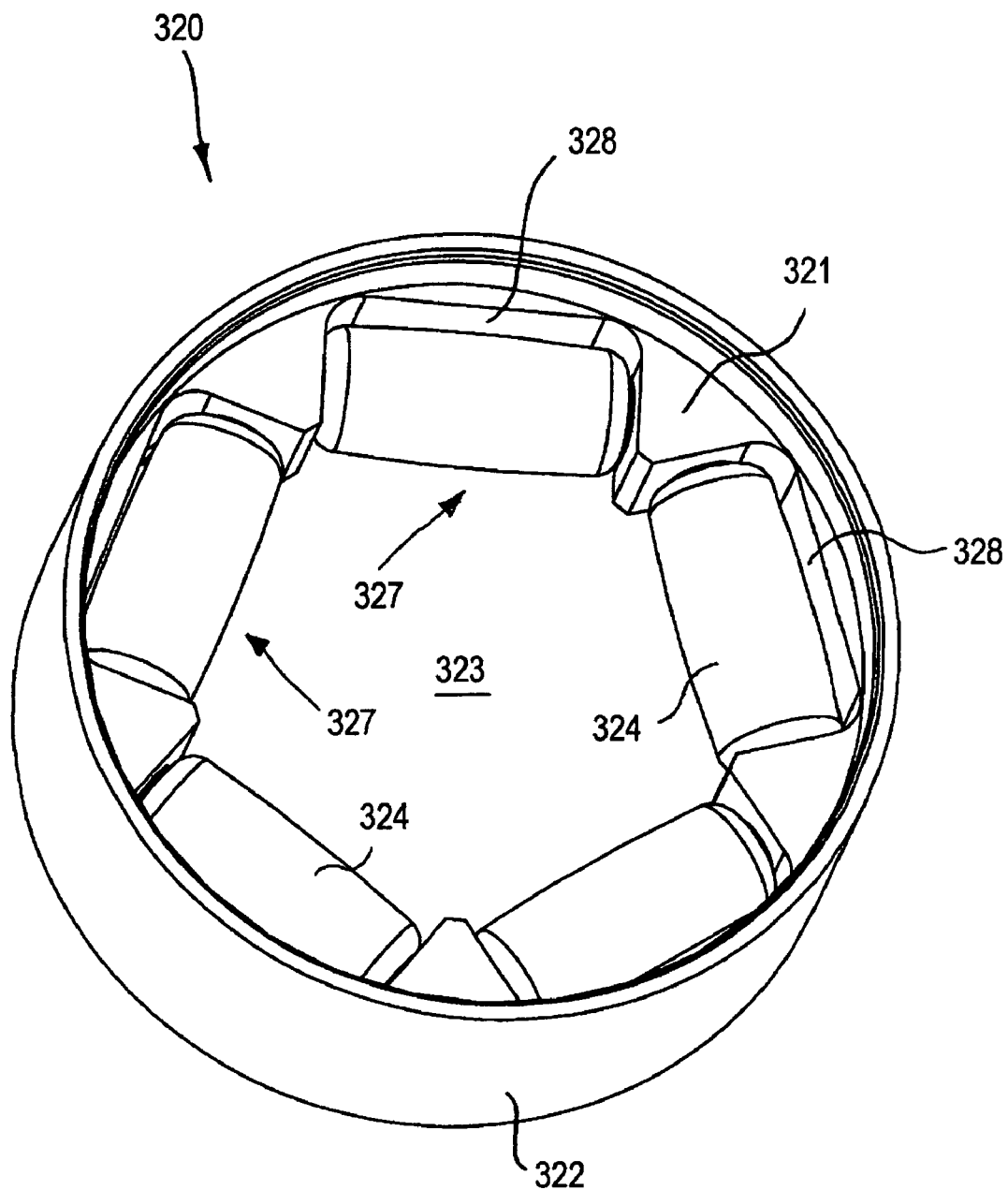
FIG. 5 is a perspective view from below of the supporting body in FIG. 4.
Figure 6:
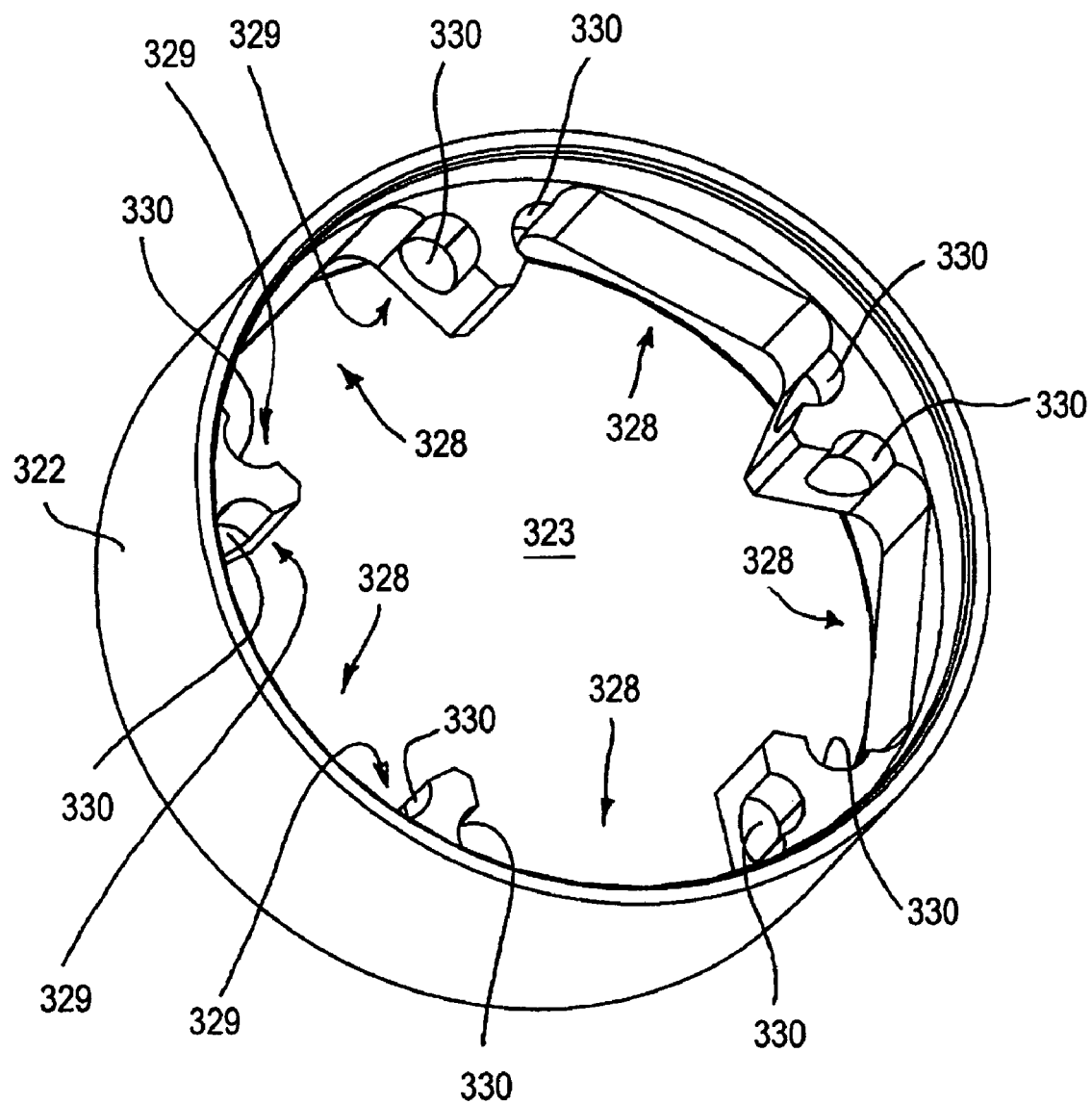
FIG. 6 is a perspective top view of the supporting body in FIG. 4 from which the rolling elements were removed.

As shown in FIGS. 2 and 3, the supporting element 320 is interposed between the first tubular element 307 and the second tubular element 308.

FIGS. 2 to 5 show a rolling arrangement 315 comprising five rollers 327. The rotation axes of the five rollers 327 define a pentagon, in particular a regular pentagon.

Figure 7:
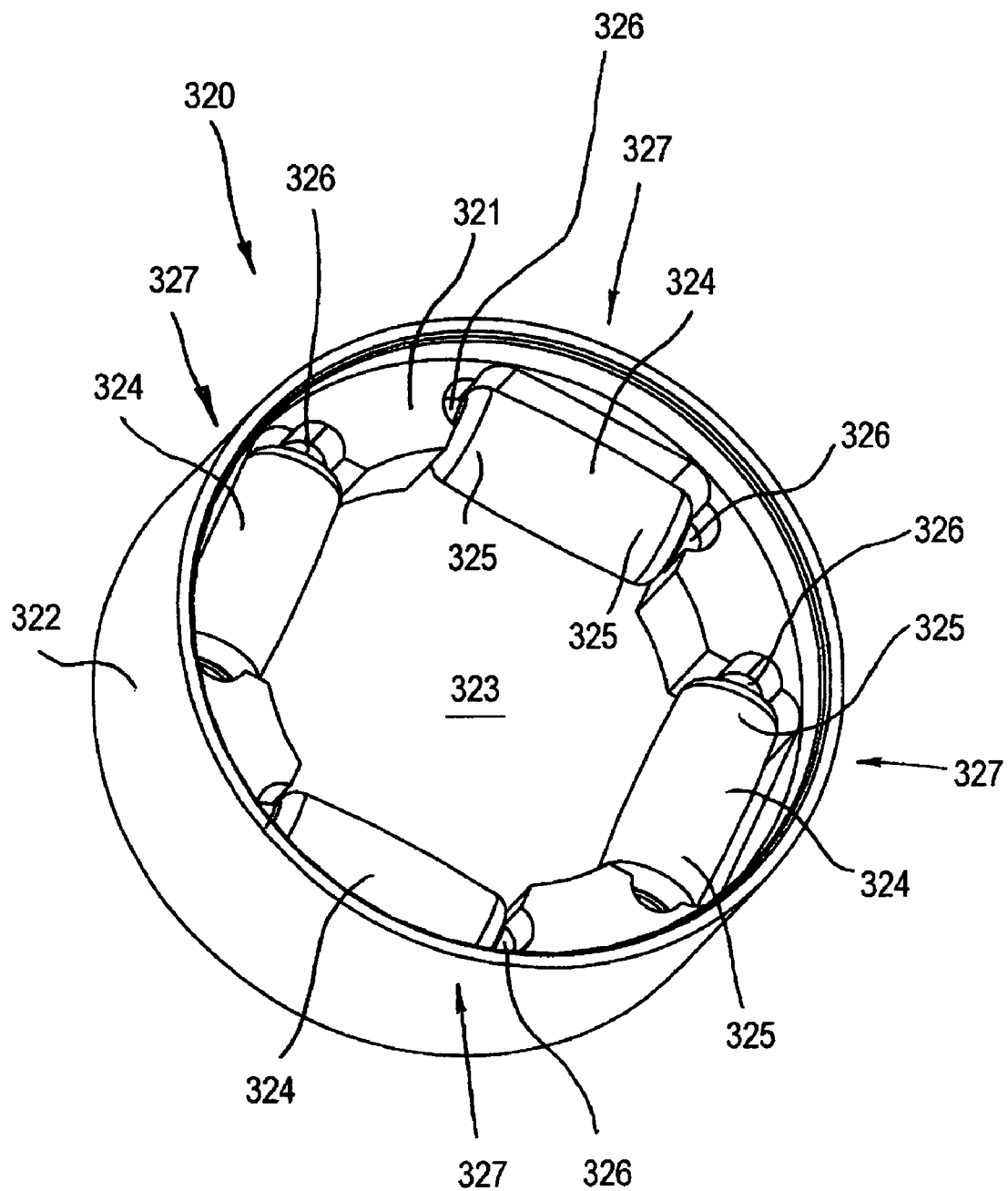
FIG. 7 is a perspective top view of a supporting body made according to a version.

FIG. 7 shows a rolling arrangement 315 comprising four rollers 327. The rotation axes of the four rollers 327 define a quadrilateral, in particular a square.

Tests conducted have enabled it to be established that the rolling arrangement 315 comprising five rollers 327 is particularly effective, inasmuch as the pentagonal shape most closely approximates the circular shape of the doses D. Further, the contact points of the rollers 327 with the doses D do not face two by two.

Alternatively, a rolling arrangement 315 can be provided comprising three rollers 327. The rotation axes of the three rollers 327 define a triangle.

As shown in FIGS. 4 to 7, the supporting element 320 comprises an annular body 321 provided with a side wall 322. The annular body 321 is internally provided with a passage opening 323 arranged for being passed through by the doses D.

The seat 303 comprises a widened intermediate portion 331, shaped so as to house the supporting element 320 and, particularly, the overall external dimensions thereof. In this way a gap chamber is defined that is traversed by thermal conditioning fluids.

Each roller 327 comprises a roller body 324 from opposite ends 325 of which pins 326 lead away.

The annular body 321 is internally provided with a plurality of cavities 328—arranged peripherally so as to surround the longitudinal axis Z—each of which is shaped so as to receive a corresponding roller 327.

Each cavity 328 is provided, at opposite end zones 329, with grooves 330 arranged for receiving the pins 326, such that the rollers 327 are rotatably supported by the annular body 321.

The cavities 328 are shaped such that a portion of the roller body 324 projects outside a corresponding cavity 328 in which it is housed and extends into the passage opening 323, so as to interact with the doses D to guide the doses D.

As the supporting element 320 is made as an element that is distinct from the tubular element arrangement 304, the rolling arrangement 315 is particularly versatile inasmuch as it can be associated with tubular element arrangement 304 of different types.

In particular, the rolling arrangement 315 defined by the set of rollers 327 and by the supporting element 320 constitutes a suitable insert to be interposed between a first tubular element 307 and a second tubular element 308 of a plurality of tubular element arrangement means 304 having shapes that may also differ significantly from one another.

Figure 8:
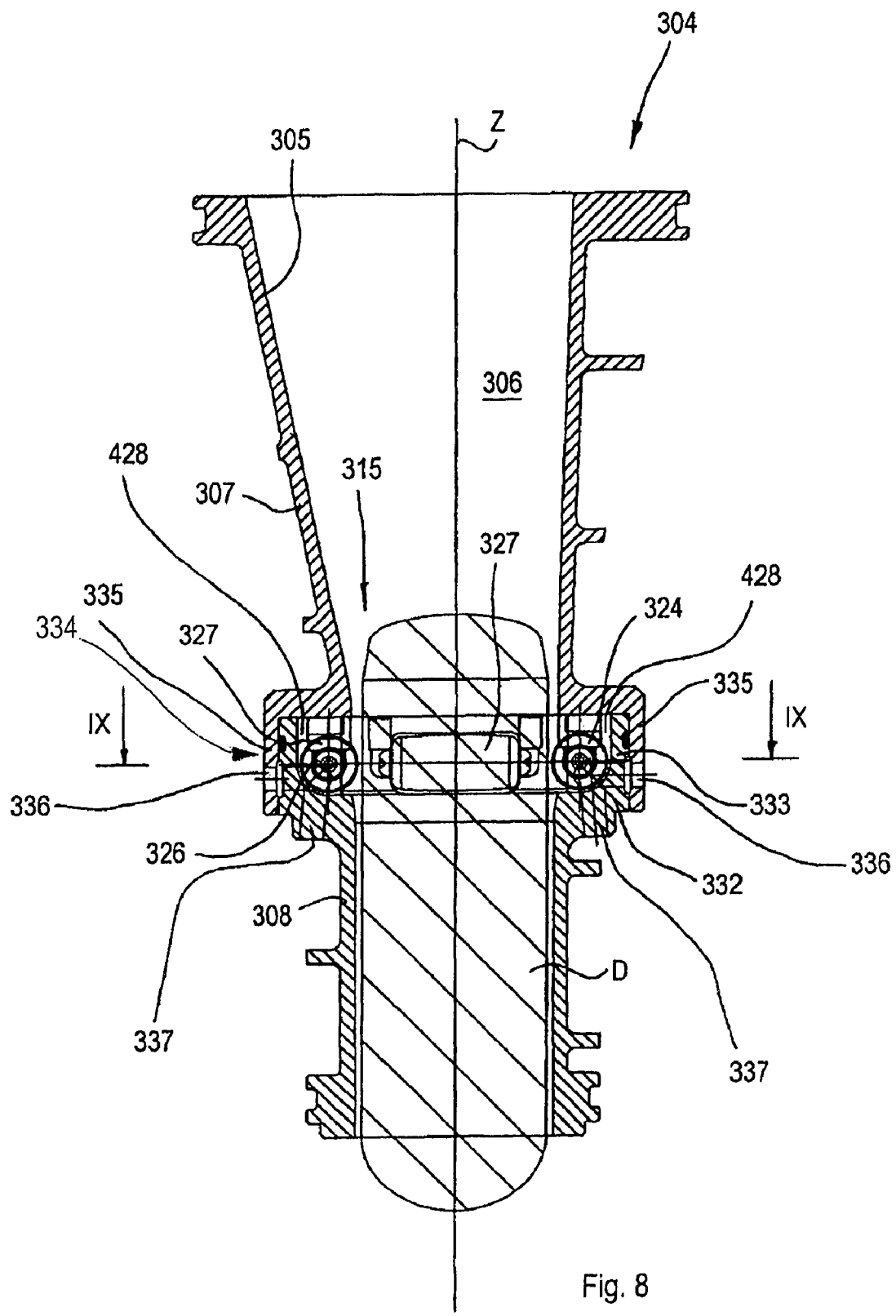
FIG. 8 is a section taken along a longitudinal plane of a further embodiment of a lower element of a transferring unit.
Figure 9:
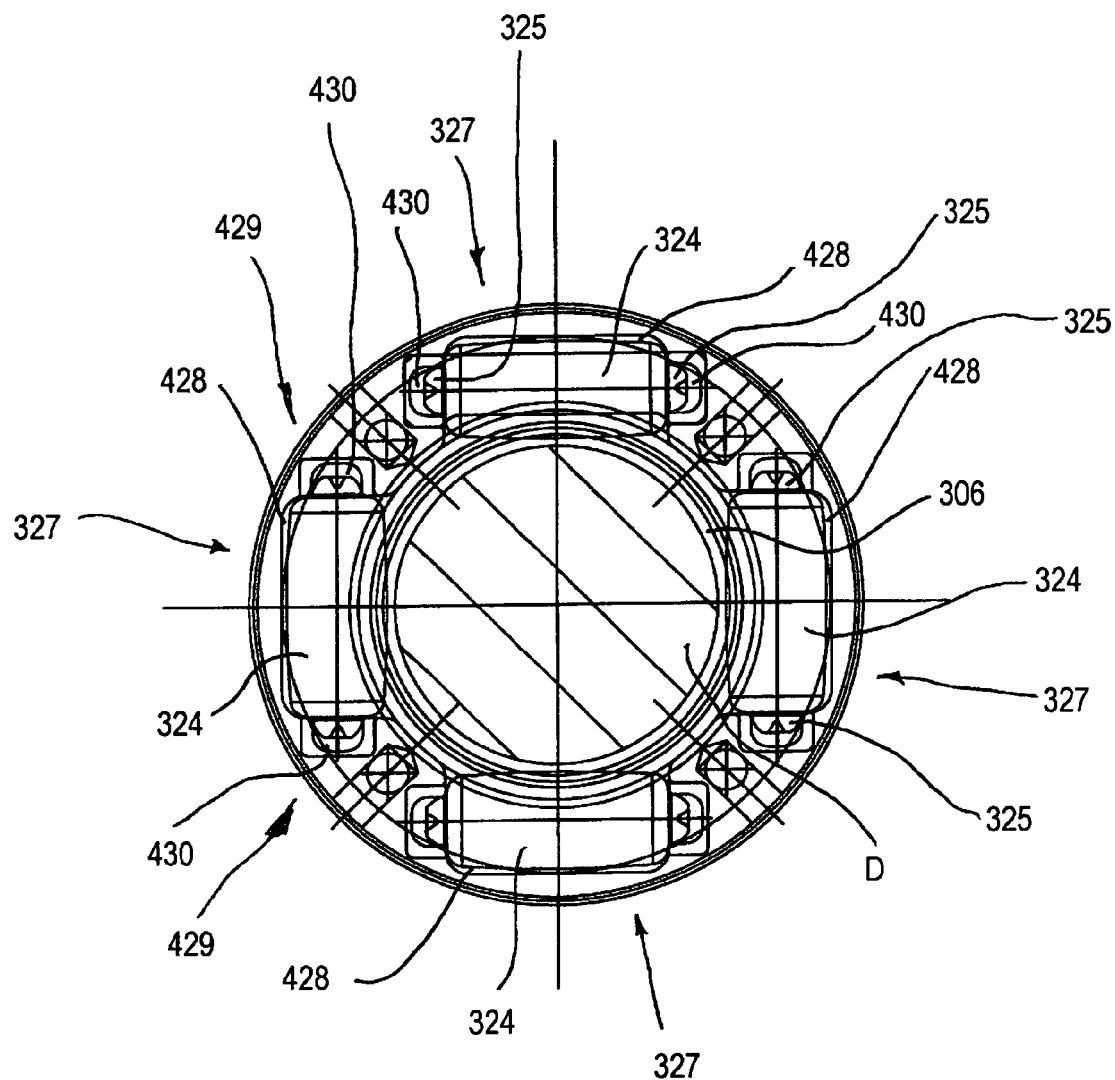
FIG. 9 is a section taken along a plane IX-IX in FIG. 8.

With reference to FIGS. 8 and 9 there is shown an embodiment of a lower element 301 in which the rolling elements 315 comprise rollers 327 that are rotatably supported directly by the tubular element arrangement 304. In other words, in the lower element 301 embodiment shown in FIGS. 8 and 9 the supporting element 320 is not provided.

The rollers 327 are shaped like those disclosed with reference to FIGS. 2 to 7.

The tubular element arrangement 304 comprises a second tubular element 308 having an annular projection 332 peripherally bounded by a side wall 333.

The annular projection 332 is internally provided with a plurality of cavities 428—arranged peripherally so as to surround the longitudinal axis Z—each of which is shaped so as to receive a corresponding roller 327.

Each cavity 428 is provided, at opposite end zones 429, with grooves 430 arranged for receiving the pins 326, such that the rollers 327 are rotatably supported by the second tubular element 308.

The cavities 428 are shaped such that a portion of the roller body 324 projects outside a corresponding cavity 428 in which it is housed and extends into the transferring chamber 306, so as to interact with the doses D to guide the doses D.

The tubular element arrangement 304 further comprises a first tubular element 307 having a further annular projection 334 peripherally bounded by a further side wall 335.

The further side wall 335 is shaped so as to surround the side wall 333, when the first tubular element 307 and the second tubular element 308 are connected together. In this manner, the further annular projection 334 closes the cavities 428, preventing the rollers 327 from disengaging from the cavities 428, and in particular preventing the pins 326 from disengaging from the grooves 430.

FIGS. 8 and 9 show a rolling arrangement 315 comprising four rollers.

A rolling arrangement 315 can be provided comprising a different number of rollers, in particular a rolling arrangement comprising five rollers.

Satisfactory experimental results have been obtained with a number of rollers equal to five, and anyway not inferior to three.

A flow of cooling fluid can be made to circulate through cooling conduits provided in the tubular element arrangement 304.

The flow of cooling fluid penetrates inside the cooling conduits by an inlet conduit arrangement 336 and exits the cooling conduits by an outlet conduit arrangement 337. The cooling conduits extend near the grooves 430—and thus near the pins 326—so as to cool the rollers 327.

The rolling arrangement 315 disclosed with reference to FIGS. 2 to 9 may comprise rollers 327 which are outwardly convex.

In an embodiment, the rollers 327 may be hollow, so that they can be filled with substances that increase the heat-exchange properties thereof. In this manner, the rollers are able to dissipate the heat transmitted by the doses D more easily.

In another embodiment, the rollers 327 can be made with a material having great thermal conductivity (for example rollers 327 made of aluminium can be provided).

The rollers 327 can be thermally conditioned so as to be maintained cold.

The temperature conditioning of the rollers 327 can occur owing to a heat exchange, mainly through conduction, with the parts that contain the rollers 327.

In particular, in the supporting block 302 cooling circuits can be provided through which a cooling fluid circulates. The rollers 327 can have a suitably chosen surface finish, so as to ensure that the rollers 327 have a low friction coefficient. In particular, the rollers 327 can have a satinised external surface. This enables the adhesion of the plastics to the rollers 327 to be reduced and the friction between the pins of the rollers 327 and the grooves 330, or the grooves 430 to be reduced.

The rolling arrangement 315 disclosed with reference to Figs. 2 to 9 may comprise instead of a single group of rollers 327 arranged substantially on the same plane positioned transversely to the longitudinal axis Z, a plurality of groups of rollers 327 arranged in consecutive positions along the longitudinal axis Z.

The rollers 327 define rows of rollers arranged substantially parallel to the longitudinal axis Z. This enables the transfer of the doses D to be made even quicker and even more precise.

In the case of the rolling arrangement 315 disclosed with reference to Figs. 2 to 7, it is possible to provide a plurality of supporting elements 320 arranged at axially consecutive portions of the tubular element arrangement 304.

Owing to the rolling arrangement 315 it is possible to obtain a calibration—and/or at least a partial shaping—of the "head" zone and/or of the "tail" zone of the doses D. This is also possible because the cross section defined by the portions of the rollers nearest the longitudinal axis Z is less than that defined by the tubular portions placed immediately above and below the rollers. The cross section defined by the portions of the rollers nearest the longitudinal axis Z has dimensions that are very similar to the average dimensions of the cross sections of the doses.

The doses D, once they have arrived in a lower cylindrical zone of the tubular element arrangement 304—i.e. in the second tubular element 308—are supported, in a position centered on the transferring chamber 306, by the first closing element 317 and by the second closing element 318 that are in the closed configuration X.

Owing to the rolling elements 315, the doses D are maintained in a configuration that is more vertical than the configuration in which they are maintained in known apparatuses. This occurs both while the doses D are waiting inside the tubular element arrangement 304 (which enables direct contact with the walls of the tubular element arrangement 304 to be avoided) and while the doses D move towards the dies underneath.

After the first closing element 317 and the second closing element 318 have passed from the closed configuration X to the open configuration Y, a contact may occur between a part of dose, arranged near the first closing element 317 and the second closing element 318, and the walls of the tubular element arrangement 304. This contact nevertheless occurs over a much more limited time than is the case with known apparatuses.

As shown in FIGS. 2, 3 and 8, the rolling arrangement 315 is positioned in an intermediate zone of the tubular element arrangement 304. In this manner, the rolling arrangement 315 interacts successively with an intermediate portion of the dose and with a "tail" portion of the dose, while a "head" portion of the dose starts (and continues) to penetrate inside the dies 6.

As the "tail" portion of the dose is guided by the rolling arrangement 315, the "head" portion of the dose is arranged in a better condition with respect to the die 6. In particular, blows between the dose and the die 6 are avoided that could prevent the dose from entering completely inside the die 6.

The rolling arrangement 315 thus performs a guiding and positioning function of the dose.

The guiding and positioning function of the dose is greater the less is the distance of the rolling arrangement 315 from the outlet opening 313 and, therefore, from the dies 6.

In order to improve the guiding and positioning function of the dose it is possible to provide a plurality of rows of rollers 327 in the lower zone of the tubular element arrangement 304, in particular in the second tubular element 308. In particular, in the embodiment disclosed with reference to FIGS. 2 to 7, there can be provided a plurality of supporting elements 320.

In another embodiment, the rolling arrangement 315 is positioned near the inlet opening 312. This enables the sliding of the doses with respect to the tubular element arrangement 304 to be limited, when the doses interact with the tubular element arrangement 304 for the first time.

The rolling arrangement 315 may comprise a plurality of rolling elements arranged angularly and axially at the points in which a first contact between the doses and the tubular element arrangement is located.

With reference to FIGS. 10 to 15, there is shown a transferring unit 10 comprising a lower element 601 and an upper element 411 that will be disclosed in greater detail below with reference to FIGS. 24 to 31. Alternatively, the transferring unit 10 may comprise a lower element 601 and another type of upper element.

The transferring unit 10 comprises a tubular body 650 arranged for being received in a seat of the lower element 601.

On the tubular body 650 a rolling arrangement 615 is rotatably supported that is arranged for interacting with a dose D of plastics.

The tubular body 650 defines a transferring chamber 606 shaped as a tubular recess and arranged for receiving a dose D and transferring the dose D to a die 6.

The rolling arrangement 615 comprises a plurality of rollers 627. The rollers 627 are aligned so as to define rows extending along a longitudinal axis of the tubular body 650.

In particular, the rollers 627 define six rows. The rotation axes of six rollers 627 each belonging to a corresponding row and arranged at the same level define a hexagon, in particular a regular hexagon.

Figure 10:
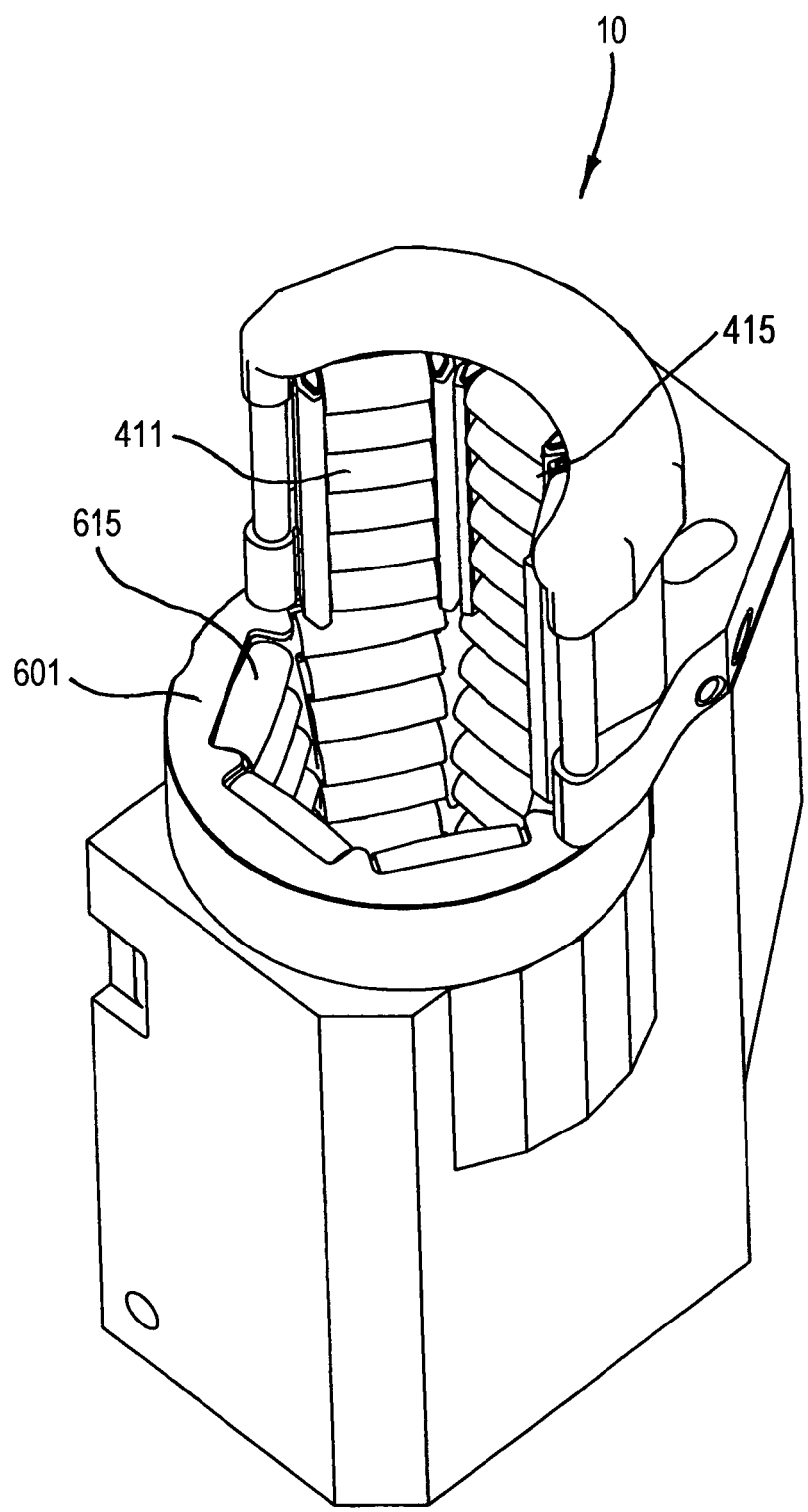
FIG. 10 is a perspective view of a transferring unit made according to a version.
Figure 11:
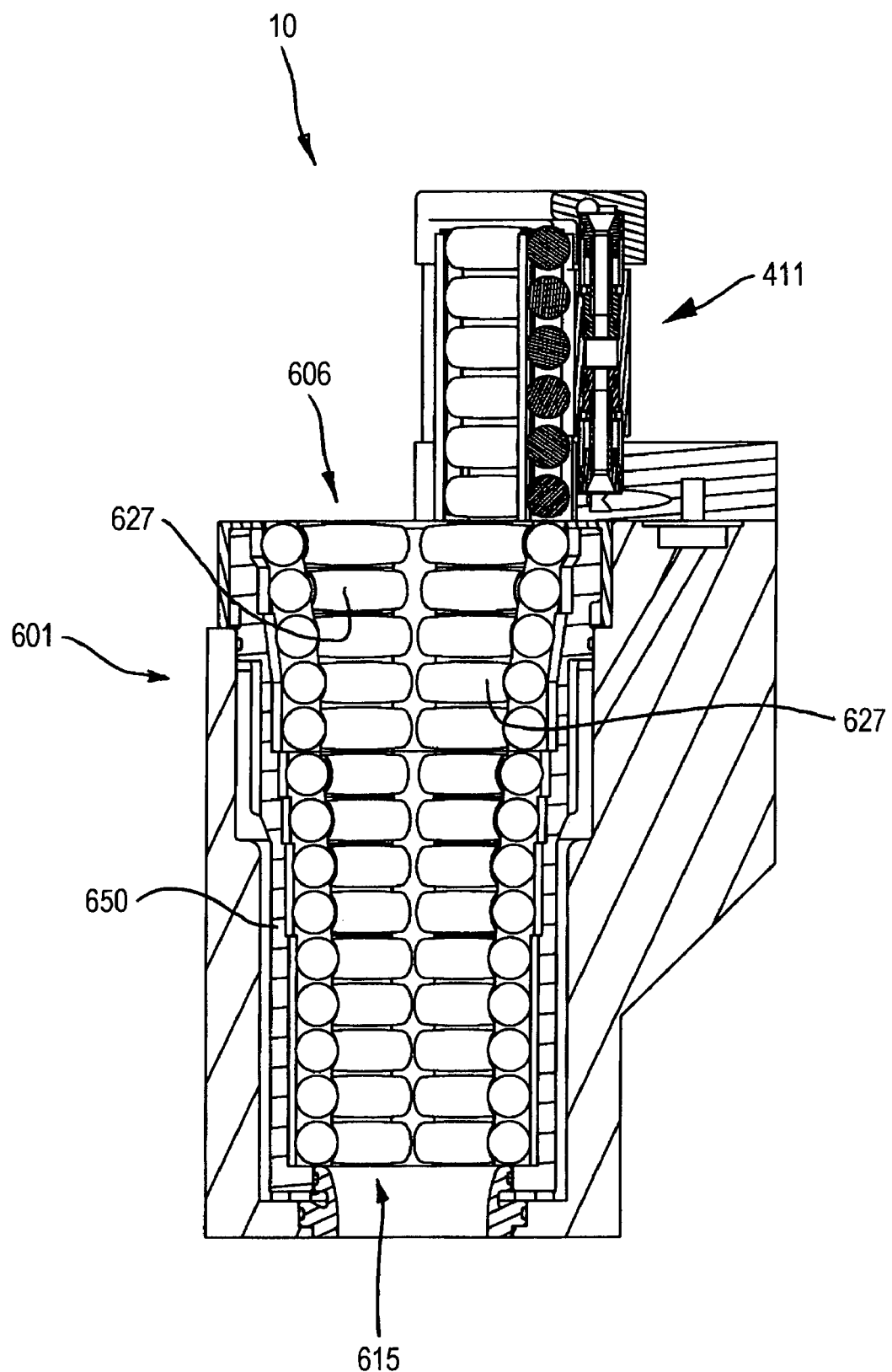
FIG. 11 is a section taken along a longitudinal plane of the transferring unit in FIG. 10.
Figure 12:
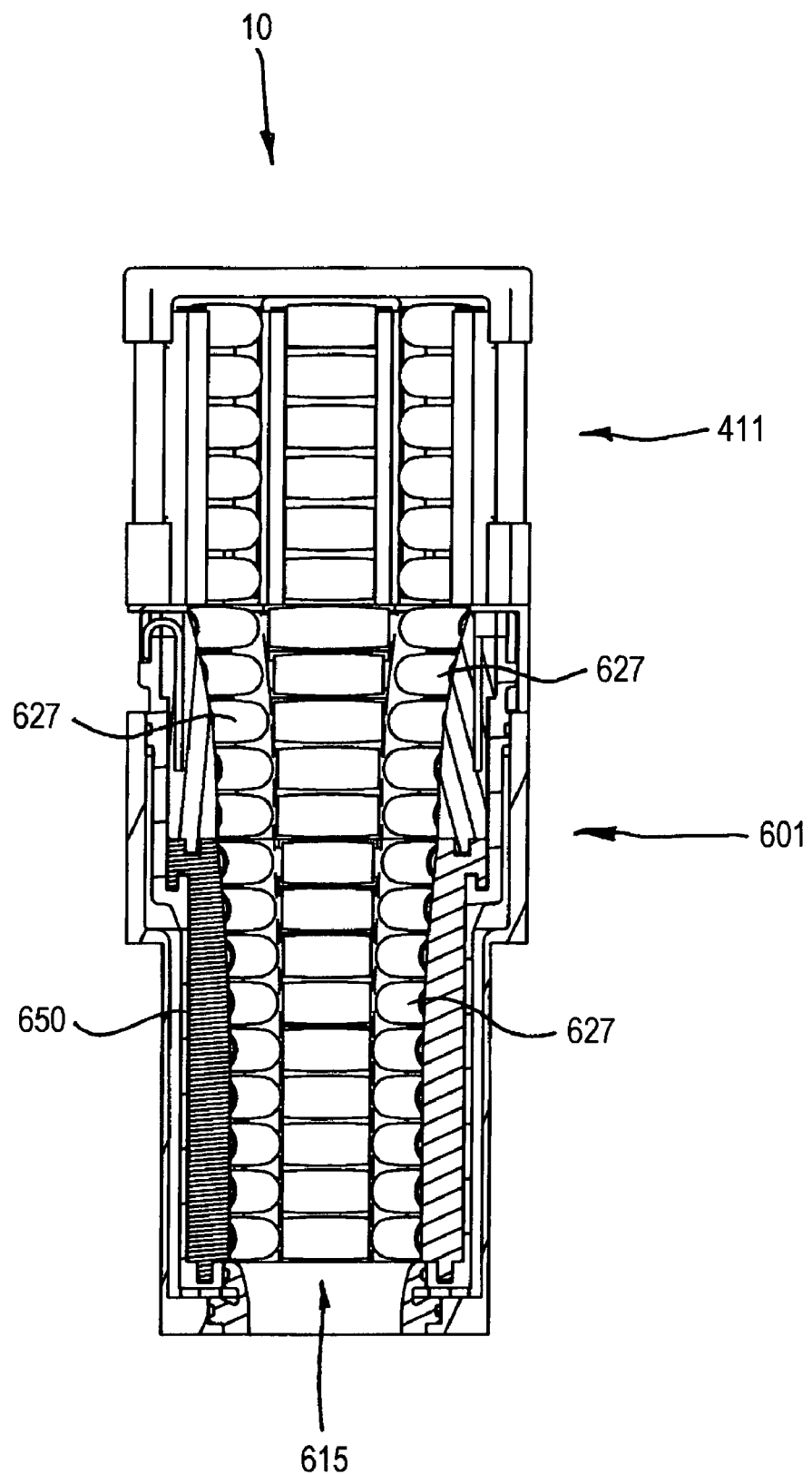
FIG. 12 is a section taken along a further longitudinal plane of the transferring unit in FIG. 10.
Figure 13:
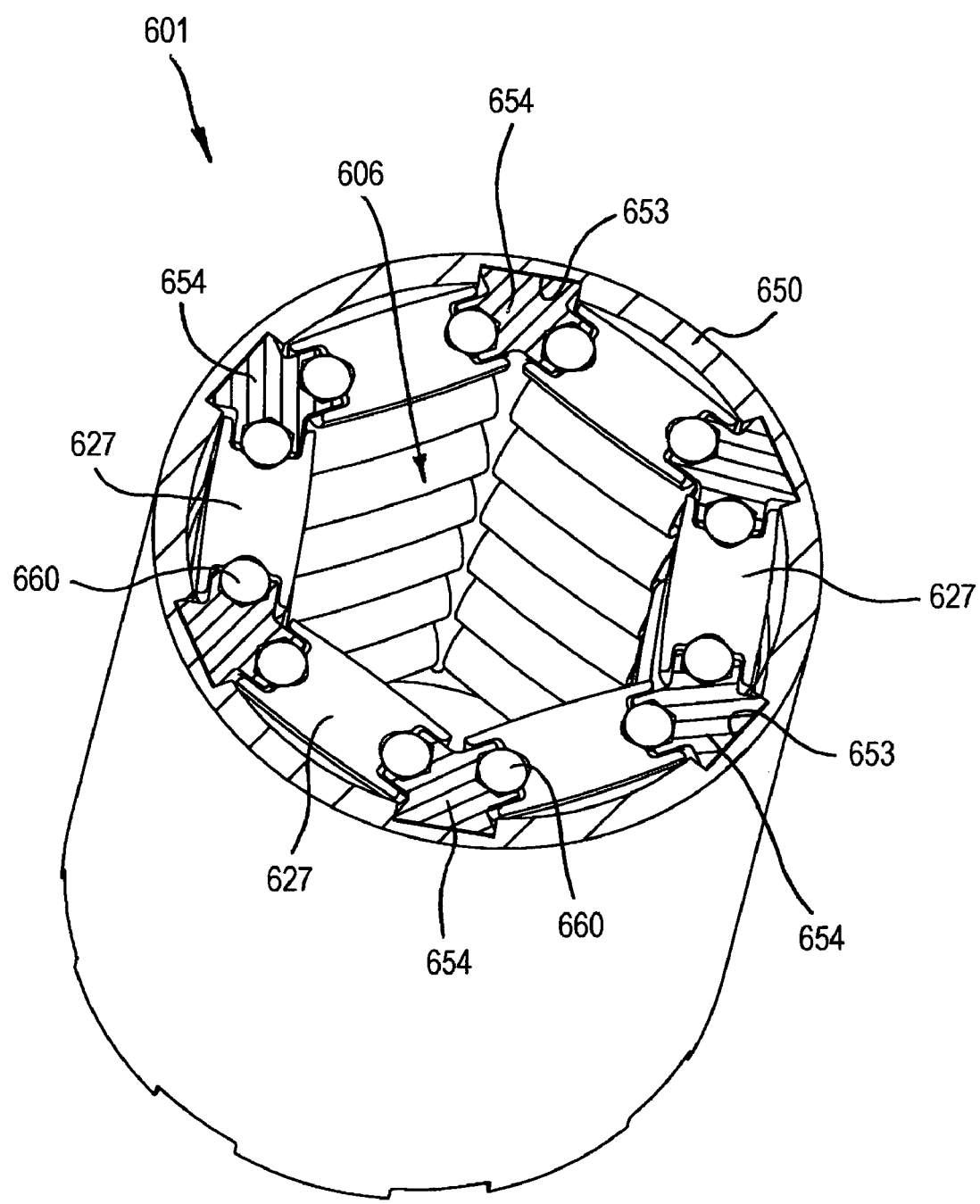
FIG. 13 is a partial and sectioned perspective view of a lower element of the transferring unit in FIG. 10.
Figure 14:
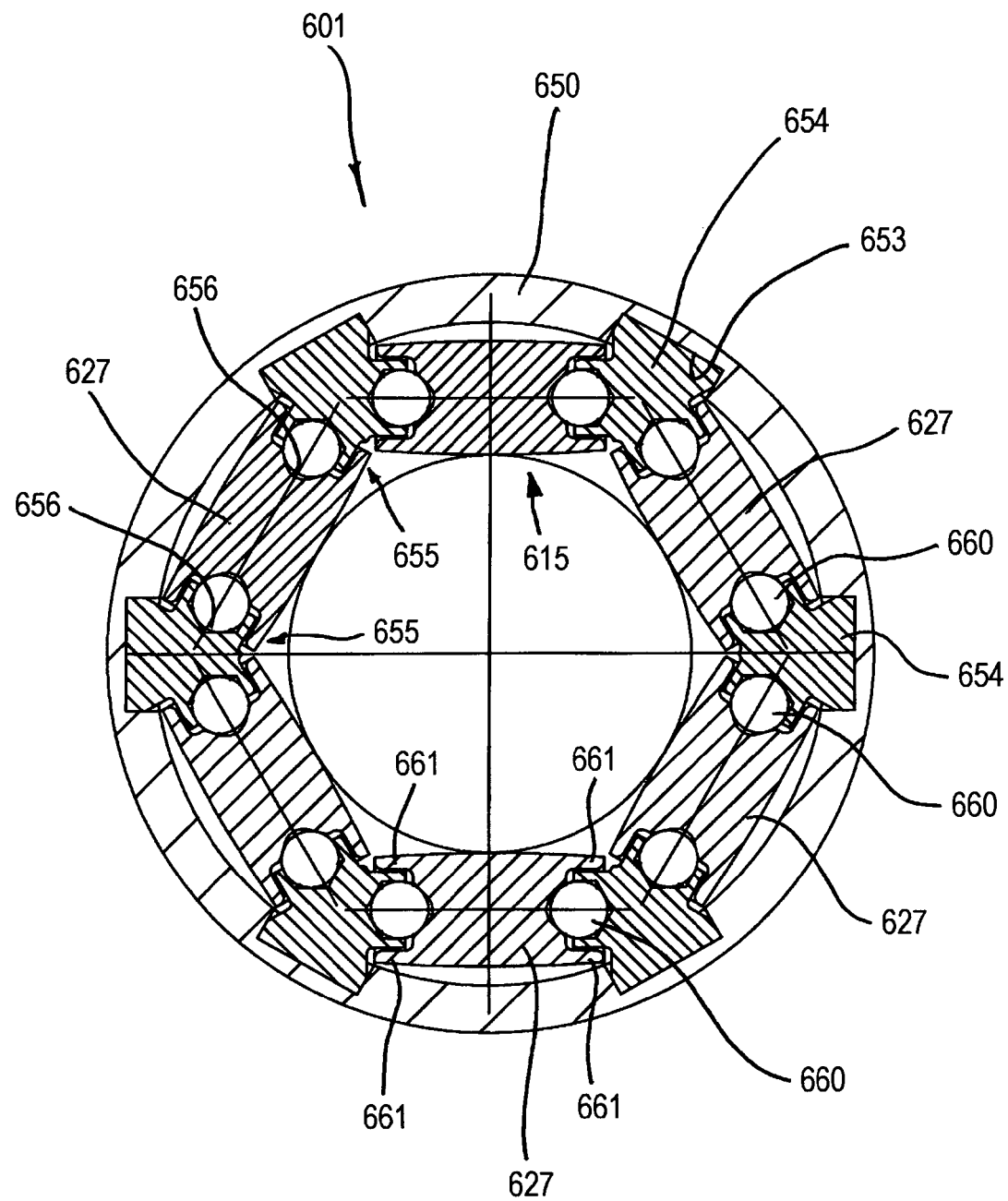
FIG. 14 is a cross section of the lower element in FIG. 13.

As shown in FIGS. 10 to 12, three of the aforesaid rows of rollers 627 are aligned on three further rows of rollers provided in the upper element 411.

The rollers 627 substantially occupy the entire internal face of the transferring chamber 606. In other words, the transferring chamber 606 is provided with rollers 627 on the entire internal side wall thereof.

The tubular body 650 comprises a plurality of grooves 653 arranged for receiving rack elements 654 that support the rolling arrangement 615. The grooves 653 are arranged substantially parallel to the longitudinal axis of the tubular body 650.

The grooves 653 can be arranged at constant angular intervals along an edge zone of the tubular body 650.

In the shown embodiment, the tubular body 650 comprises six grooves 653. In embodiments that are not shown, the tubular body may comprise a number of grooves 653 that is greater or less than six.

Each roller 627 comprises, at opposite ends 655 thereof, seats 656 arranged for receiving balls 660 that rotatably connect the rollers 627 to the rack elements 654, as will be disclosed in greater detail below.

Figure 15:
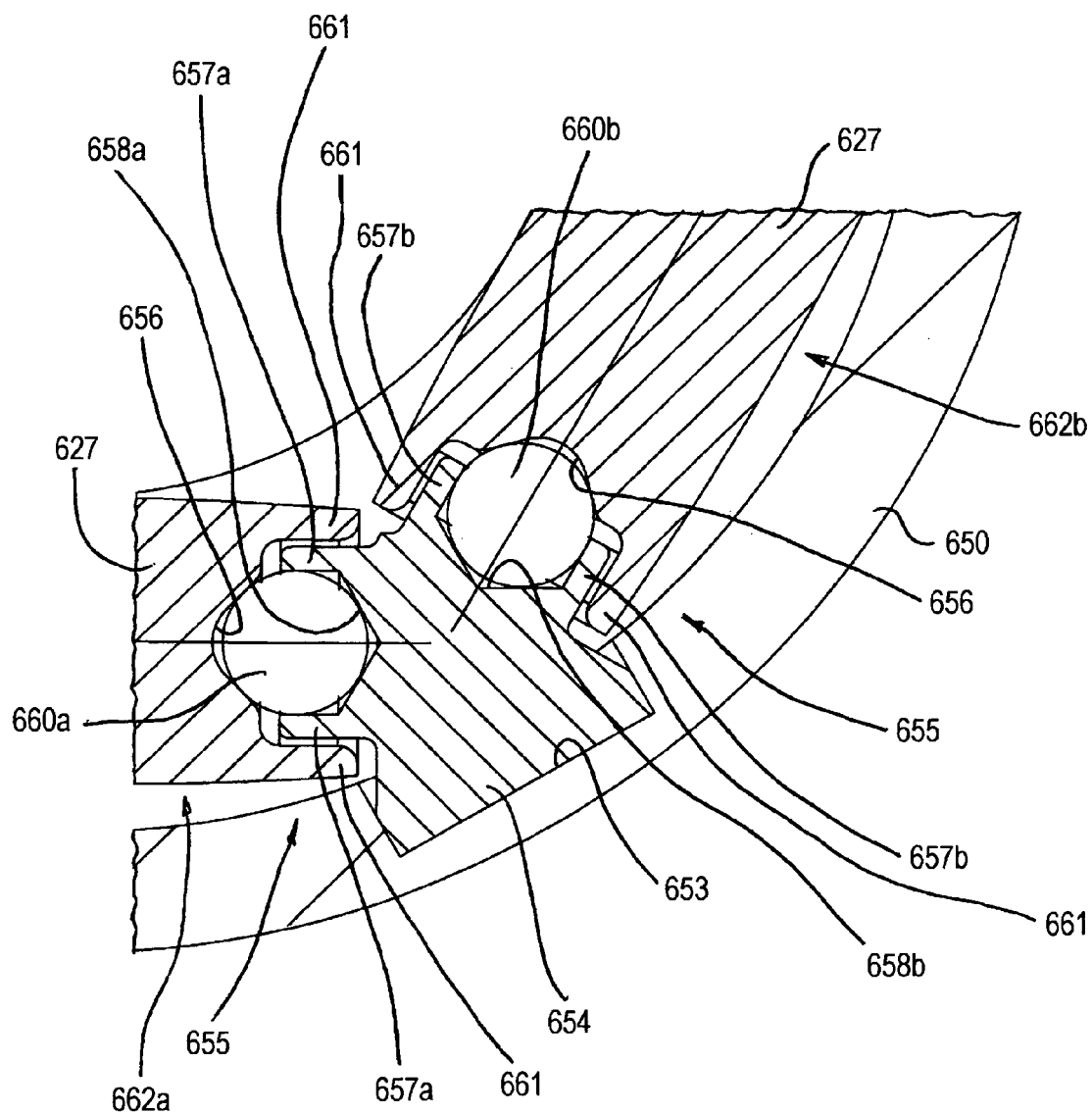
FIG. 15 is an enlarged detail of FIG. 14.

As shown in FIG. 15, each rack element 654 comprises a plurality of first projecting portions 657a that define first cavities 658a each of which is arranged for partially receiving a corresponding first ball 660a and a plurality of second projecting portions 657b that define second cavities 658b each of which is arranged for partially receiving a corresponding second ball 660b. Each first ball 660a, therefore, comprises a portion received inside the corresponding, first cavities 658a of the rack element 654 and a further portion received inside the seat 656 of the roller 627.

Similarly, each second ball 660b comprises a portion received inside the corresponding second cavities 658b of the rack element 654 and a further portion received inside the seat 656 of the roller 627.

The first cavities 658a receive first balls 660a arranged for rotatably connecting a first row 662a of rollers to the rack element 654, whilst the second cavities 658b receive second balls 660b arranged for rotatably connecting a second row 662b of rollers, adjacent to the first row 662a of rollers, to the rack element 654.

During mounting, the rollers 627 are positioned between the rack elements 654 so as to be rotatably supported by the rack elements by means of the balls 660. Subsequently, the preassembled unit consisting of the rack elements 654—and of the rollers 627 and of the balls 660 supported thereby—is inserted inside the lower element 601 such that all the rack elements 654 (in the illustrated case six rack elements 654) are received substantially simultaneously in the grooves 653, each groove 653 housing a corresponding rack element 654.

Between the rollers 627 and the balls 660 and between the balls 660 and the rack elements 654 friction of rolling type develops, which enables the transfer of the doses D to be made quicker.

Between the rollers 627 and the balls 660 and between the balls 660 and the rack elements 654 clearance of a preset amount is provided that enables friction to be limited as much as possible.

Further, the first projecting portions 657a, the second projecting portions 657b and zones 661 of the rollers 627 that bound the seats 656 protect the balls 660 from contact with dirt and deposits of materials of various type that would cause an increase in friction.

In addition, the rack elements 654 prevent the plastics penetrating between adjacent rows of rollers.

The rollers 627 can be made of the materials with which the rollers 327 are made that are disclosed with reference to FIGS. 2 to 9.

In order to make the rollers, various materials can also be used, for example materials the composition and nature of which have great water repellence, i.e. great repellence to plastics.

Further, the rollers 627 can have surface shapes and finishes like those of the rollers 327 disclosed with reference to FIGS. 2 to 9.

With the lower elements 301 disclosed with reference to FIGS. 2 to 9 and with the lower elements 601 disclosed with reference to FIGS. 10 to 15 there can be associated upper elements of known type, i.e. devoid of a rolling arrangement.

Alternatively, with the upper elements 301 disclosed with reference to FIGS. 2 to 9 and with the lower elements 601 disclosed with reference to FIGS. 10 to 15 there can be associated upper elements provided with a rolling arrangement, as disclosed below.

Figure 17:
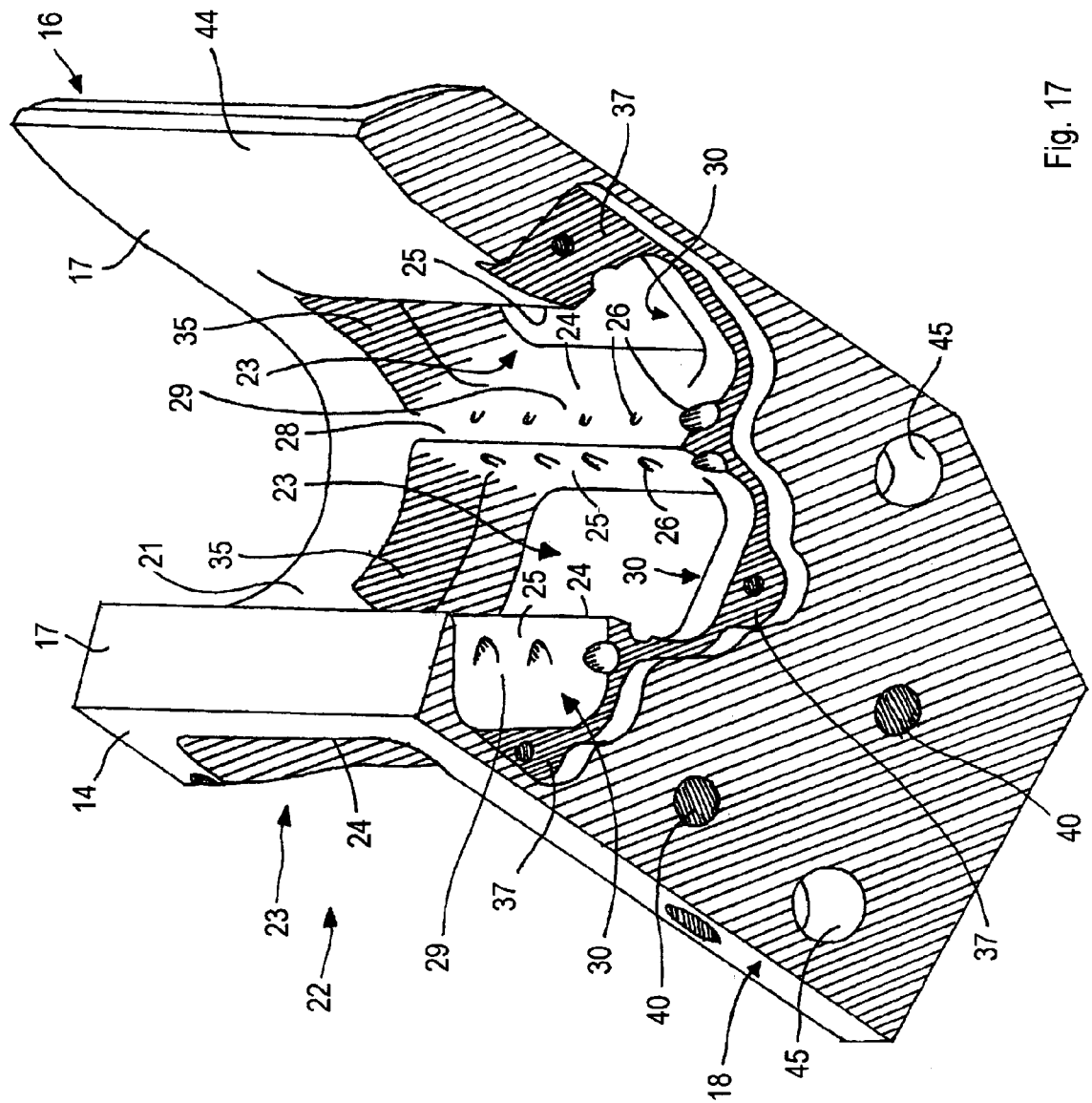
FIG. 17 is a perspective bottom view of a supporting structure for supporting the upper element in FIG. 16.

Each upper element 11 comprises a supporting structure 14, shown in detail in FIG. 17, arranged for supporting a rolling arrangement 15.

The supporting structure 14 is provided with a first part 16 comprising a substantially vertical "C", "U" or "J"-shaped side wall 17, and thus defining the lateral opening 12. On the base of the side wall 17 there is arranged a second part 18 of the supporting structure 14, with a substantially flat shape, which enables the upper element 11 to be fixed to a corresponding lower element. The second part 18 is substantially orthogonal to the side wall 17, i.e. extends on a horizontal plane in the illustrated example.

The second part 18 has two circular holes 45 suitable for housing screws 46 that, by engaging corresponding threaded holes obtained in the lower element, fix the supporting structure 14 thereto.

An internal surface 21 of the side wall 17 bounds an upper portion of the recess 13.

The side wall 17 comprises a lateral protrusion 44 arranged on a side of the recess 13 that during movement of the transferring unit 10 is in a position more outside the further carousel 9, as schematically shown in FIG. 1.

The side wall 17 is provided with a housing arrangement 22 arranged for housing the rolling arrangement 15. The housing arrangement 22 comprises three openings 23 with a substantially rectangular shape in the side wall 17. In an embodiment that is not shown, the openings 23 can also be other than three in number.

Each opening 23 is bounded, parallel to the longitudinal axis Z, by a first side surface 24 and by a second side surface 25. The first side surface 24 and the second side surface 25 are arranged in a substantially vertical position and are mutually facing. On the first side surface 24 and on the second side surface 25 there is obtained a plurality of seats 26.

The rolling arrangement 15 comprises a plurality of rollers 27 arranged for entering into contact with and guiding the dose D during operation of the apparatus 1. The rollers 27 have respective substantially horizontal axes and can be slightly convex externally.

Pins of the rollers 27, which are not visible in the Figures, are housed in the seats 26.

The seats 26 are arranged so that the rollers 27 mounted inside the same opening 23 are substantially vertically aligned and partially exit the internal surface 21 of the side wall 17 to come into contact with the dose D when the dose D is contained in the recess 13.

In each opening 23 there is housed a row of the rollers 27. In the illustrated example, all the rows contain the same number of rollers 27, for example five. The rollers 27 in corresponding positions of different rows are substantially aligned on one another, i.e. they are at the same height.

In an embodiment that is not shown, two or more different rows may comprise numbers of rollers that are different form one another.

The rollers 27 are arranged so that, when the dose. D is contained in the recess 13, it cannot come into contact with parts 28 of the internal surface 21 defined by two separating portions 29 that mutually separate the openings 23.

The rollers 27 are inserted into the respective seats 26 from the outside of the recess 13.

More in particular, the roller 27a that occupies a lower position in each opening 23 is introduced into the corresponding seat from below through a corresponding cavity 30 made in the second part 18 of the supporting element 14. The cavities 30, which have a substantially rectangular shape, are visible in FIG. 17.

The remaining rollers 27b occupying positions other than the lower position, are inserted laterally into the respective seats from outside the side wall 17.

Each transferring unit 10 comprises a locking arrangement 31 arranged for preventing the rollers 27 leaving the respective seats 26 during operation.

Figure 19:
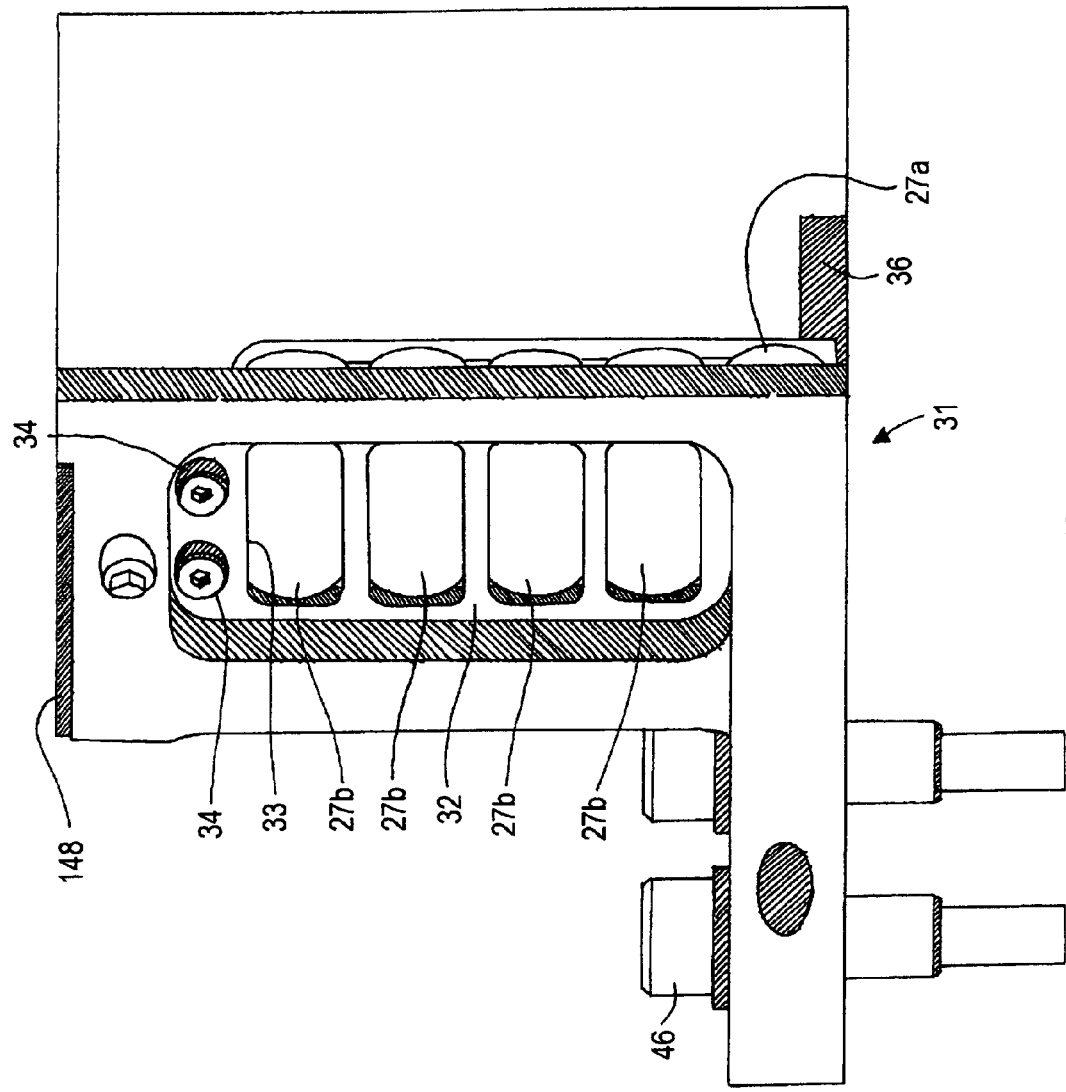
FIG. 19 is a side view of the upper element in FIG. 16.

The locking arrangement 31 comprises rack elements 32, visible in FIG. 19, arranged for preventing the pins of the rollers 27b occupying positions other than the lower position exiting the respective seats 26.

The rack elements 32 are shaped as a plate and are provided with windows 33 inside which the rollers 27 can rotate.

The rack elements 32 are fixed to the supporting structure 14 by further screws 34, which are visible in FIGS. 19, that engage further threaded holes, which are not visible in the Figures, which holes are made in a projection 35 of the supporting structure 14, shown in FIG. 17. The projection 35 projects from the side wall 17 into an upper zone of each opening 23.

The locking arrangement 31 further comprises a closing plate 36, visible in FIG. 16, arranged for preventing the pins of the rollers 27a occupying a lower position in each opening 23 from exiting.

The closing plate 36 is substantially "C" or "U"-shaped, to be inserted and fixed into a housing 37, shown in FIG. 17, made on a lower surface of the second part 18 of the supporting structure 14.

Figure 18:
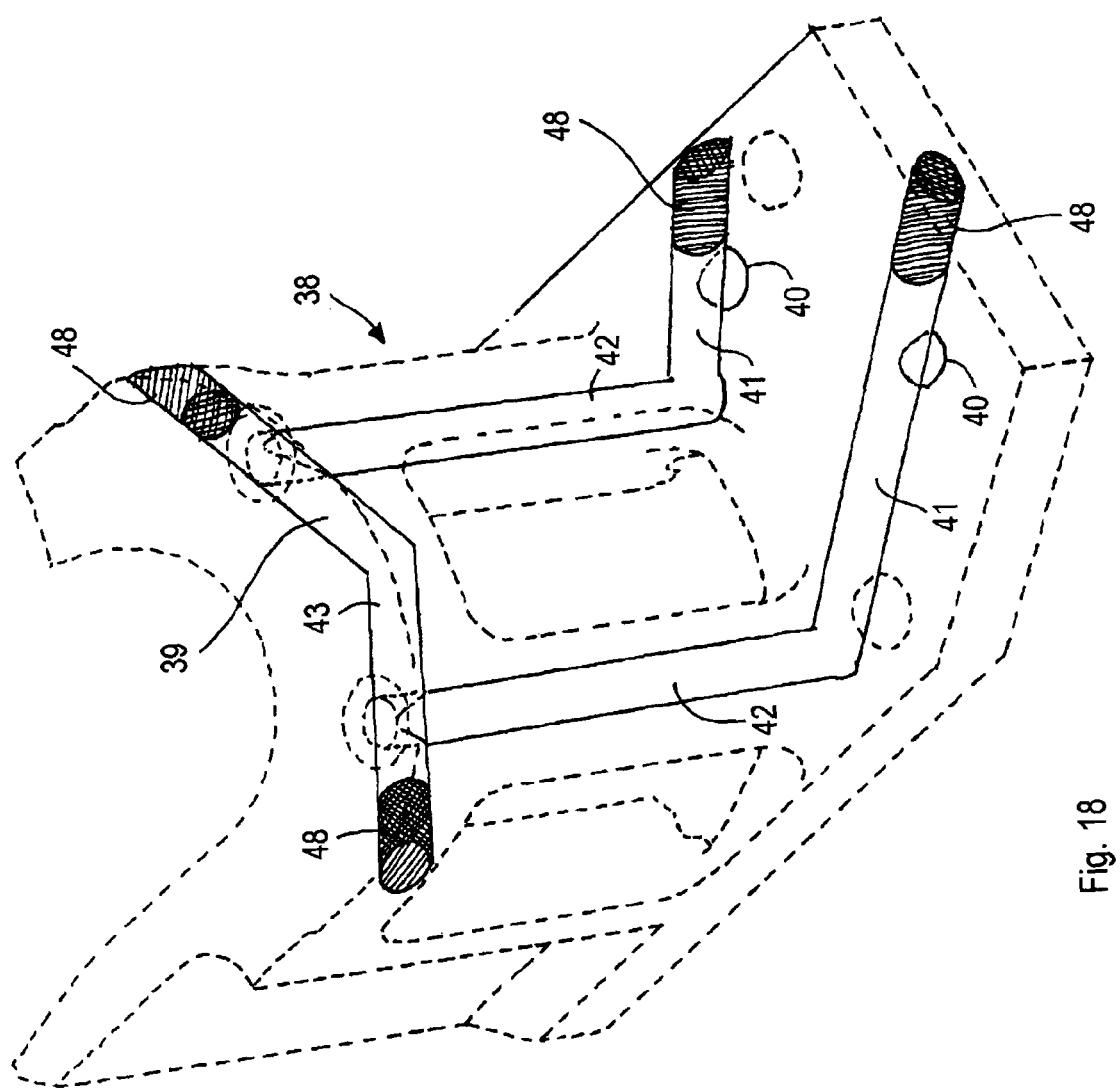
FIG. 18 is a schematic perspective view showing a cooling arrangement for cooling the upper element in FIG. 16.

The supporting element 14 further comprises a cooling arrangement 38, shown in FIG. 18, arranged for cooling the upper element 11 and the rollers 27 by a low-temperature cooling fluid, for example water, during operation of the apparatus 1.

The rollers 27 are made of a material provided with good thermal conductivity so as to eliminate the heat arising from the contact with the doses D.

Also the supporting structure 14 is made of a material provided with good thermal conductivity to promote the heat exchange between the cooling fluid and the rollers 27.

In an embodiment, the rollers 27 may be hollow, so that they can be filled with substances that increase the heat-exchange properties thereof. In this manner, the rollers are able to dissipate easily the heat that they receive from the dose.

The cooling arrangement 38 comprises a conduit 39, shown in FIG. 18, obtained inside the supporting structure 14. The conduit 39 is connected to a cooling circuit made inside the lower element by delivery and return holes 40 for the low-temperature cooling fluid.

The conduit 39 comprises first substantially horizontal portions 41 obtained inside the second part 18 and communicating with second substantially vertical portions 42 obtained inside the separating portions 29. The conduit 39 further comprises a connecting portion 43 obtained in the side wall 17 above the openings 23, arranged for connecting upper ends of the second portions 42.

The conduit 39 is thus defined by a succession of rectilinear portions that can be obtained by drilling at the machine tool. Closing elements are provided that are arranged for closing an end of each portion for defining the conduit 39 as a single conduit through which the cooling fluid can flow. The closing elements may comprise a plurality of caps 48 inserted into the first portions 41 and into the connecting portion 43 and a plate 148, shown in FIG. 16, that closes the second portions 42 above.

The cooling arrangement 38, by cooling the supporting structure 14, and in particular the separating portions 29, prevent the rollers 27 and the corresponding pins heating excessively because of the heat transmitted by the dose D. This prevents the plastics forming the dose D adhering to the rollers 27 and thus enables the dose D to fall rapidly into the transferring chamber of the lower element.

The rollers 27 have a suitably chosen surface finish, so as to ensure that they have a low friction coefficient. This makes it possible both to reduce the adhesion of the plastics to the rollers 27 and to diminish the friction between the pins, of the rollers 27 and the respective seats 26.

During operation of the apparatus 1, the further carousel 9 moves along the closed path P1 the transferring units 10, taking the transferring units 10 one after another near the port 4 while the cutting device separates the doses D from the extruder.

Each dose D, after being cut, enters through the lateral opening 12 into the recess 13 of a transferring unit 10.

The lateral protrusion 44 helps to maintain the dose D inside a corresponding recess 13 whilst the transferring unit 10 takes the dose D from the port 4 to the die 6.

The transferring unit 10, after receiving the dose D, moves the dose D along the closed path P1 to the moulding device 2. Simultaneously, the dose D drops by gravity inside recess 13, rotating the rollers 27, so that between the dose D and the rollers 27 a rolling friction is generated. In this manner, the dose D can move downwards inside the recess 13 more easily than would occur if the dose D had to slide along a continuous surface, possibly bounding the inside of the recess 13.

Before the transferring unit 10 reaches the portion T1, the dose D enters the transferring chamber of the lower element completely. The dose D remains in the lower element for sufficient time for it to be able to acquire the desired diameter.

From the transferring chamber, the dose D is then transferred along the portion T1 into the cavity of the die 6 for moulding the preform.

In an embodiment, the transferring device 7 may comprise a dispensing means device for dispensing one or more jets of a pressurized fluid, for example compressed air, so as to push downwards the dose D contained inside a transferring unit 10. The dispensing device can be positioned above the upper element 11 and dispense the pressurized fluid to inside the recess 13. In this manner, the dose D descends faster inside the transferring unit 10.

The rollers 27 are simple components and are not very subject to faults; the overall reliability of the apparatus 1 compared with known apparatuses is thus increased.

Further, the rollers 27 are easily procurable on the market and have a very low cost; consequently, also the cost of making the apparatus 1 is limited.

The doses D can slide inside the upper element 11 with a low friction coefficient even after the rolling arrangement, for example the rollers 27, have been used for a long time. This did not occur in known apparatuses, in which, due to wear, the internal surface of the transferring units became very smooth after a relatively short operating time. The doses adhered easily to such a smooth surface, which significantly worsened the operation of the known apparatuses.

By suitably dimensioning the shape of the side wall 17 and the position of the rolling arrangement 15 in relation to the dimensions of the dose D, it is possible to insert with precision the dose D inside the transferring chamber, preventing the dose D from being able to tilt in an undesired manner while it is inside the transferring unit 10.

This can be done by mounting the rollers 27 so as to define a recess 13 in which the dose D can move with little clearance. In other words, the recess 13 has a cross section that is hardly greater than the cross section of the dose D. In this manner the dose D is not free to oscillate and tilt whilst it moves inside the recess 13.

In an alternative embodiment, shown in FIG. 20, each transferring unit 10 comprises an upper element 111 having rolling arrangement 115 supported by rack elements 132 that differ from the rack elements 32 disclosed with reference to FIG. 19, as explained below. The rack elements 132 are shaped as a plate and are provided with substantially rectangular windows 133 through which the rollers 127 can project. Unlike the embodiment shown in FIGS. 16 to 19, the rack elements 132 are fixed to an external surface 49 of the side wall 17. A lower portion 50 of each rack element 132 is housed in a rectilinear guide 51 made in the second part 18 of the upper element 11. The rack elements 132 are mounted by screws 134 that engage threaded holes, not visible in the Figures, made on the external surface 49 of the side wall 17.

Figure 20:
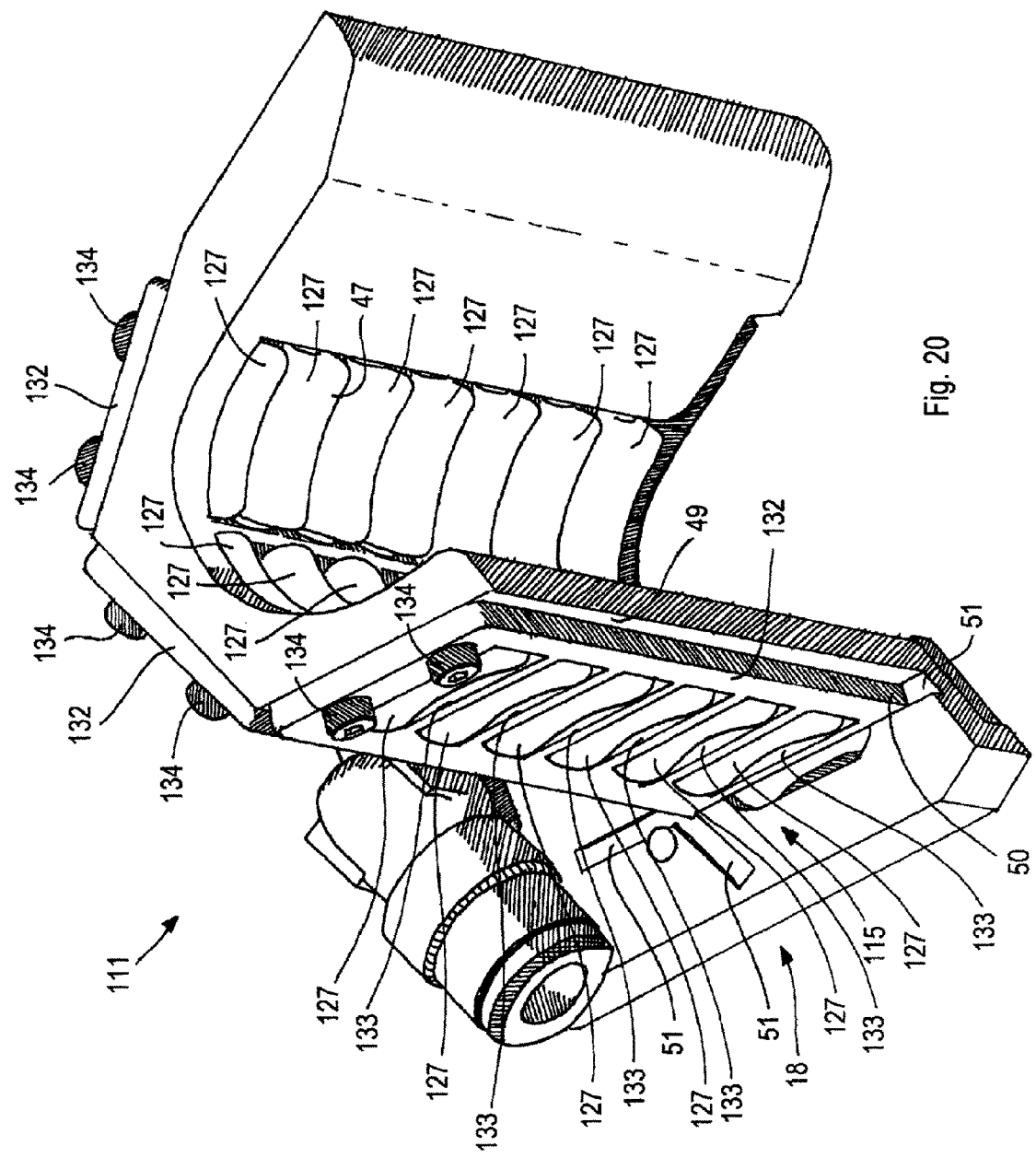
FIG. 20 is a perspective top view of a further embodiment of an upper element in a transferring unit.

For guiding the dose D with greater precision inside the transferring unit 10, the rollers 127 used in the embodiment in FIG. 20 have a concave side surface 47.

In this embodiment, the rollers 127 are bounded by a side surface 47 having a curvature radius that is substantially similar to the radius of the cross section of the dose D, if the dose D has a substantially circular cross section. In this manner it is possible to increase the contact surface between the dose D and the rollers 127 and thus guide the dose D with greater precision.

Figure 21:
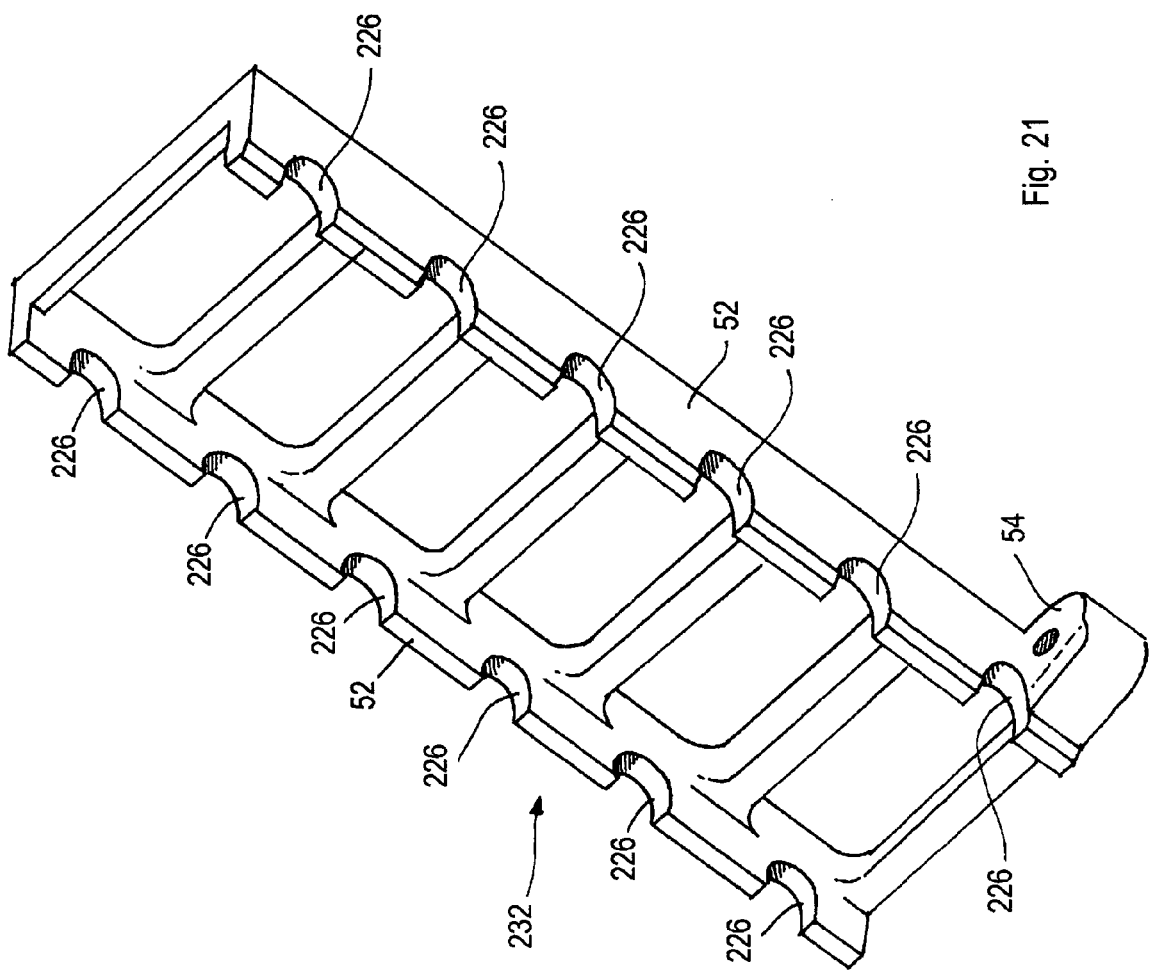
FIG. 21 is a perspective, view of a rack element used in the upper element in FIG. 20.
Figure 22:
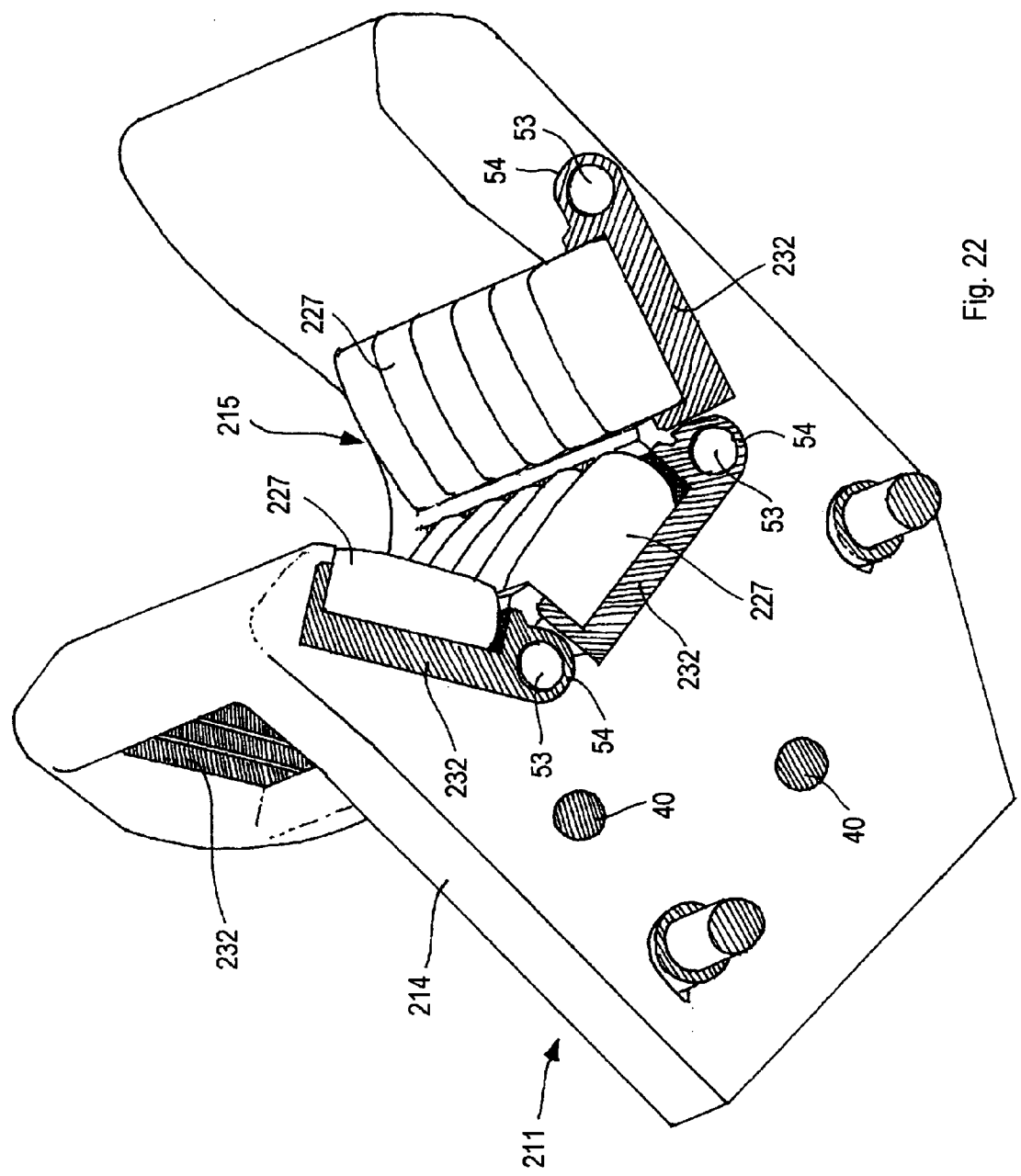
FIG. 22 is a perspective bottom view of another embodiment of an upper element in a transferring unit.
Figure 23:
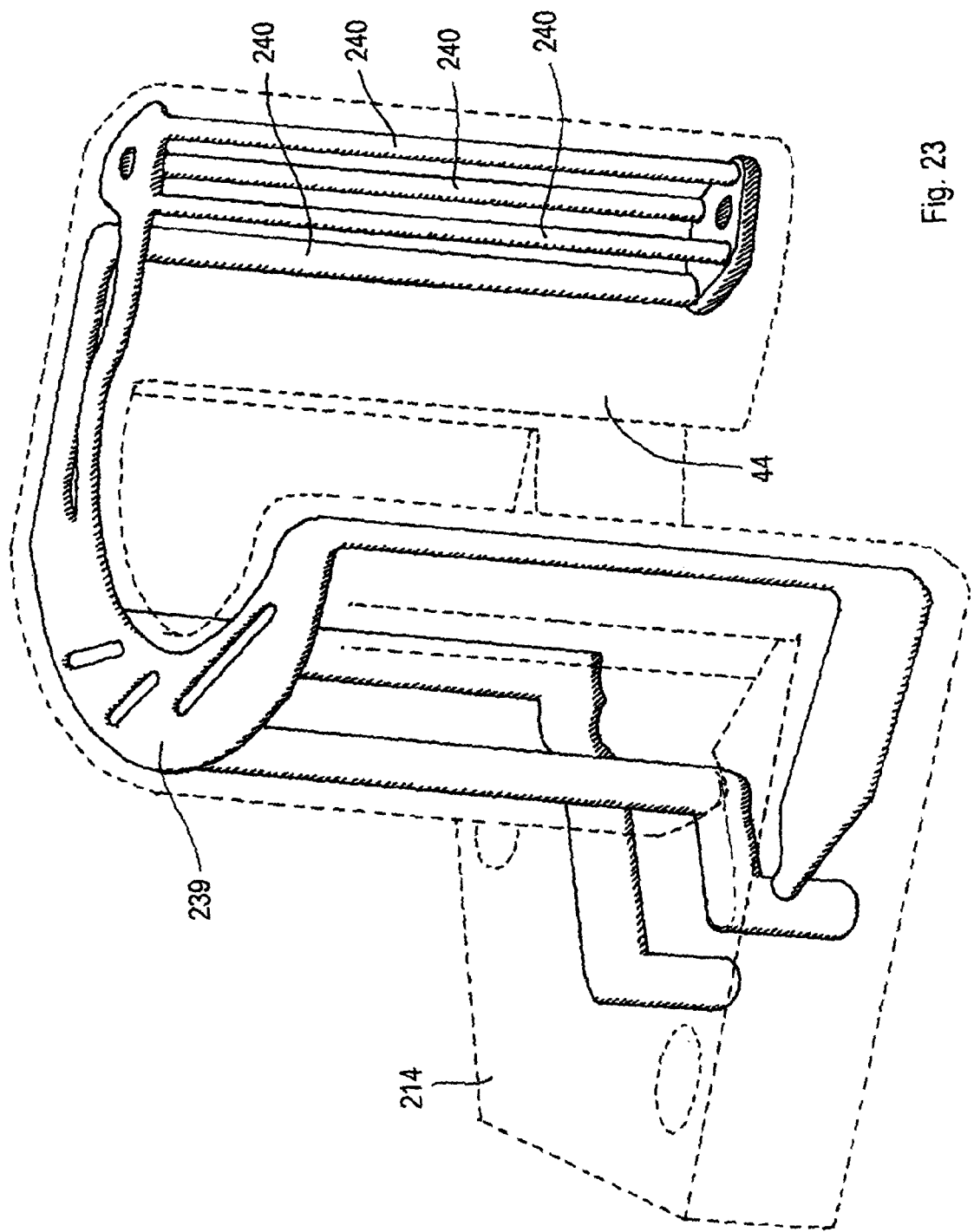
FIG. 23 is a perspective view of a cooling arrangement of the upper element in FIG. 22.
Figure 24:
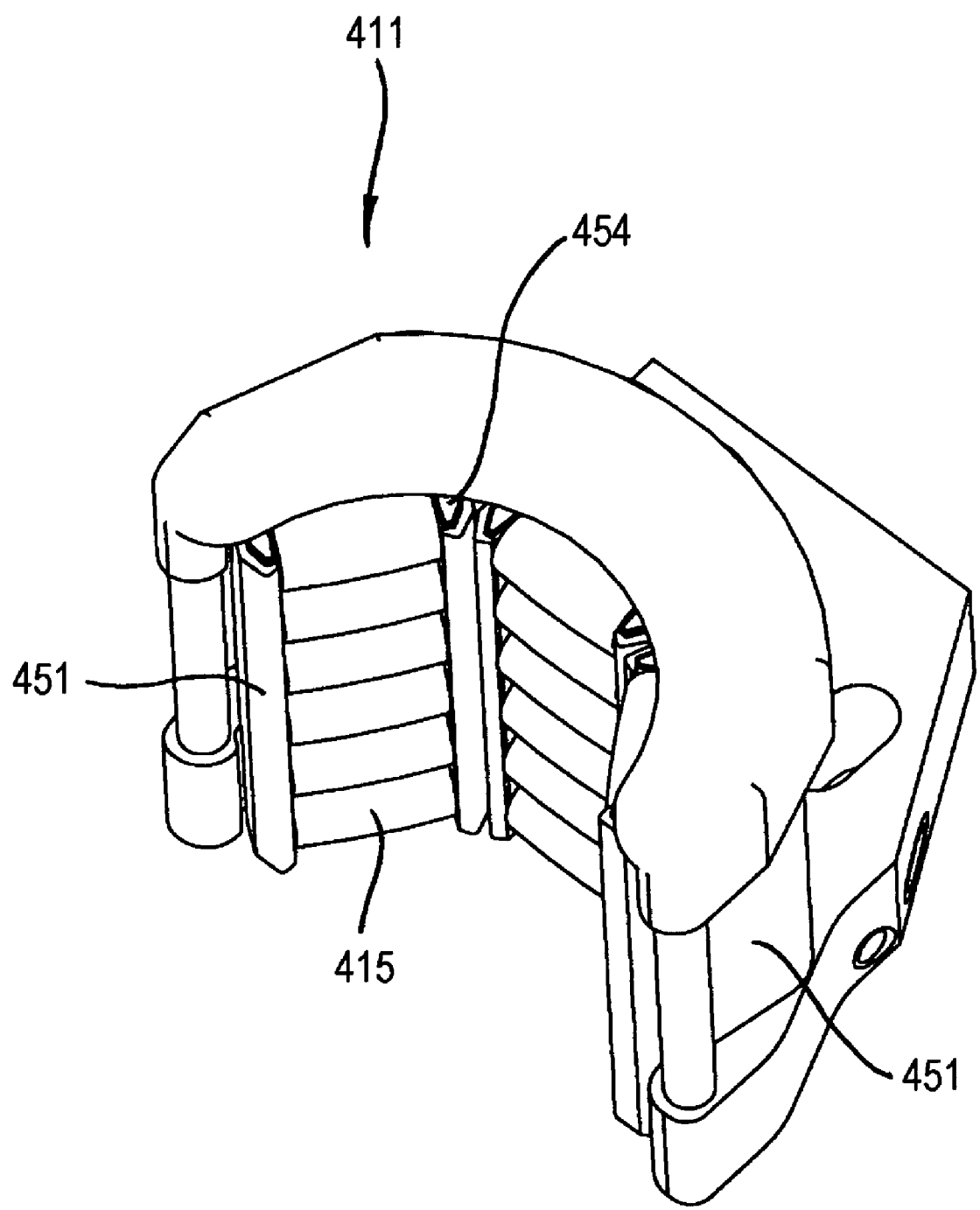
FIG. 24 is a perspective top view of a further embodiment of an upper element in a transferring unit.
Figure 25:
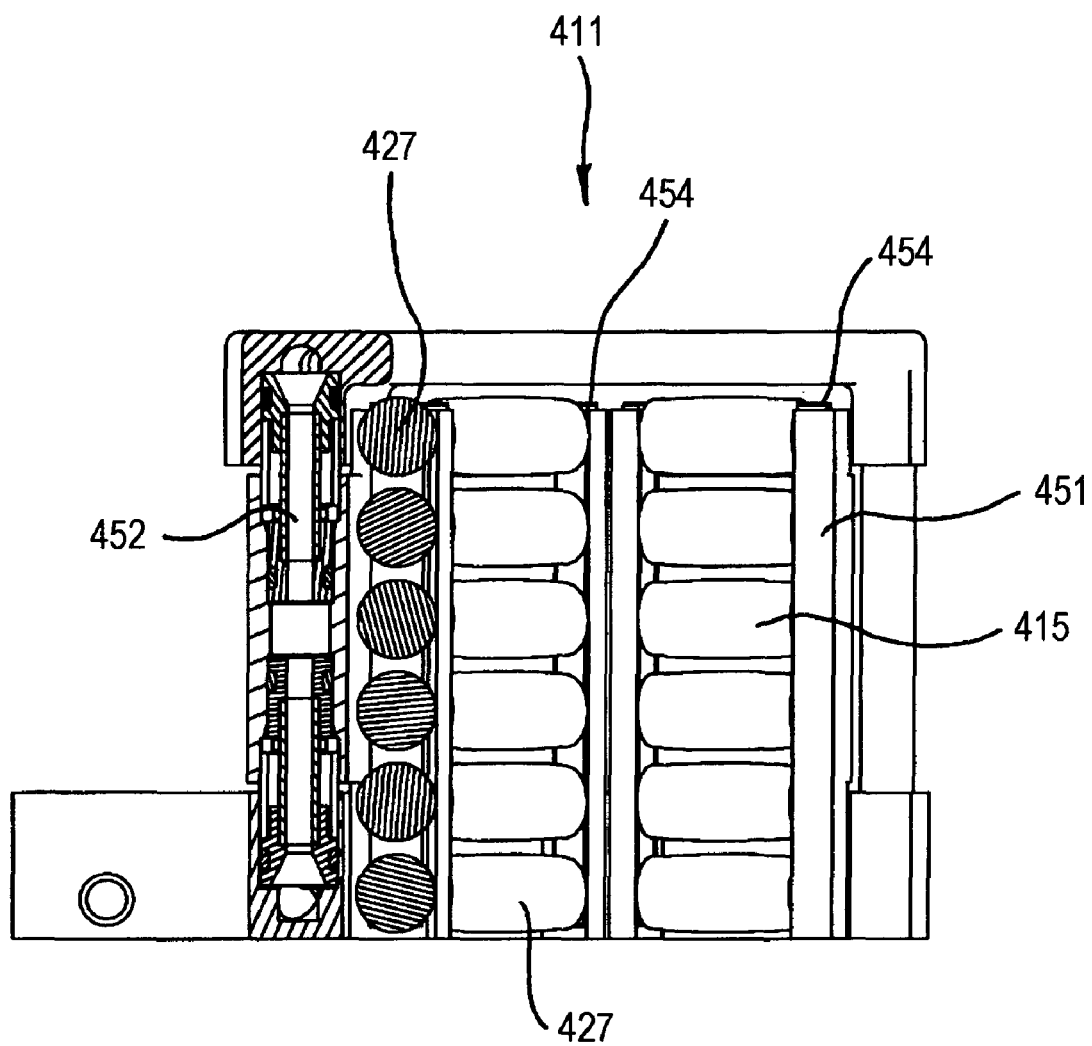
FIG. 25 is a section taken along a longitudinal plane of the upper element in FIG. 24.

In a further alternative embodiment, shown in FIGS. 21 to 23, each transferring unit 10 comprises an upper element 211 provided with rolling arrangement 215, the pins of which are housed in seats 226 obtained on rack elements 232. In particular, the seats 226 are obtained in lateral portions 52 of the rack elements 232.

Owing to the seats 226 obtained on the rack elements 232, it is not necessary to make seats on the first part of the supporting structure 214, but it is sufficient to fix the rack elements 232 correctly to the side wall 17.

For this purpose, the rack elements 232 are inserted into the supporting structure 214 from below and fixed thereto by fixing screws 53. Each rack element 232 is provided with a protrusion 54 situated to the side of one of the lateral portions 52 and suitable for engaging in a shapingly coupled manner with a corresponding gap obtained in the supporting structure 214.

In this manner precision processing such as the creation of the seats 26 on the first part of the supporting structure can be avoided.

As the rolling arrangement 215 comprises a plurality of rollers 227 rotatably supported by the rack elements 232 rather than by the supporting structure 214, the latter does not have to be particularly resistant to wear. For this reason, the supporting structure 214 can be suitably made of a composite material, obtained, for example, by combining metal powders with plastic materials. An example of usable composite material is a combination of aluminium and polyamides.

The supporting structure 214 made of composite material can be produced by means of a selective laser sintering technology or by means of similar technologies.

In this manner it is possible to make inside the supporting structure 214 a cooling arrangement having any desired shape, so as to cool the upper element 211 in an optimal manner. For example, the cooling arrangement may comprise a conduit arrangement having a curved portion 239 or a variable cross section. The cooling arrangement can also comprise a plurality of parallel conduits 240, that extend in the lateral protrusion 44 parallel to the longitudinal axis of the upper element 211.

In an alternative embodiment that is not shown, the rolling arrangement can also comprise cylindrical rollers, i.e. having a surface that is not outwardly convex, or concave.

With reference to FIGS. 24 to 30 there is shown a further embodiment of an upper element 411 comprising a body 450 provided with a substantially vertical "C" or "U" or "J"-shaped side wall 417, and defining a lateral opening 412.

The upper element 411 comprises a plurality of supporting elements 451, on each of which is rotatably supported rolling arrangement 415 arranged for interacting with a dose D of plastics. In the illustrated example there are provided three supporting elements 451. In embodiments that are not shown there can be provided supporting elements 451 that are more or less than three in number.

The supporting elements 451 are mutually facing along the side wall 417.

Each supporting element 451 is hinged on the body 450 so as to oscillate with respect to the body 450.

Figure 30:
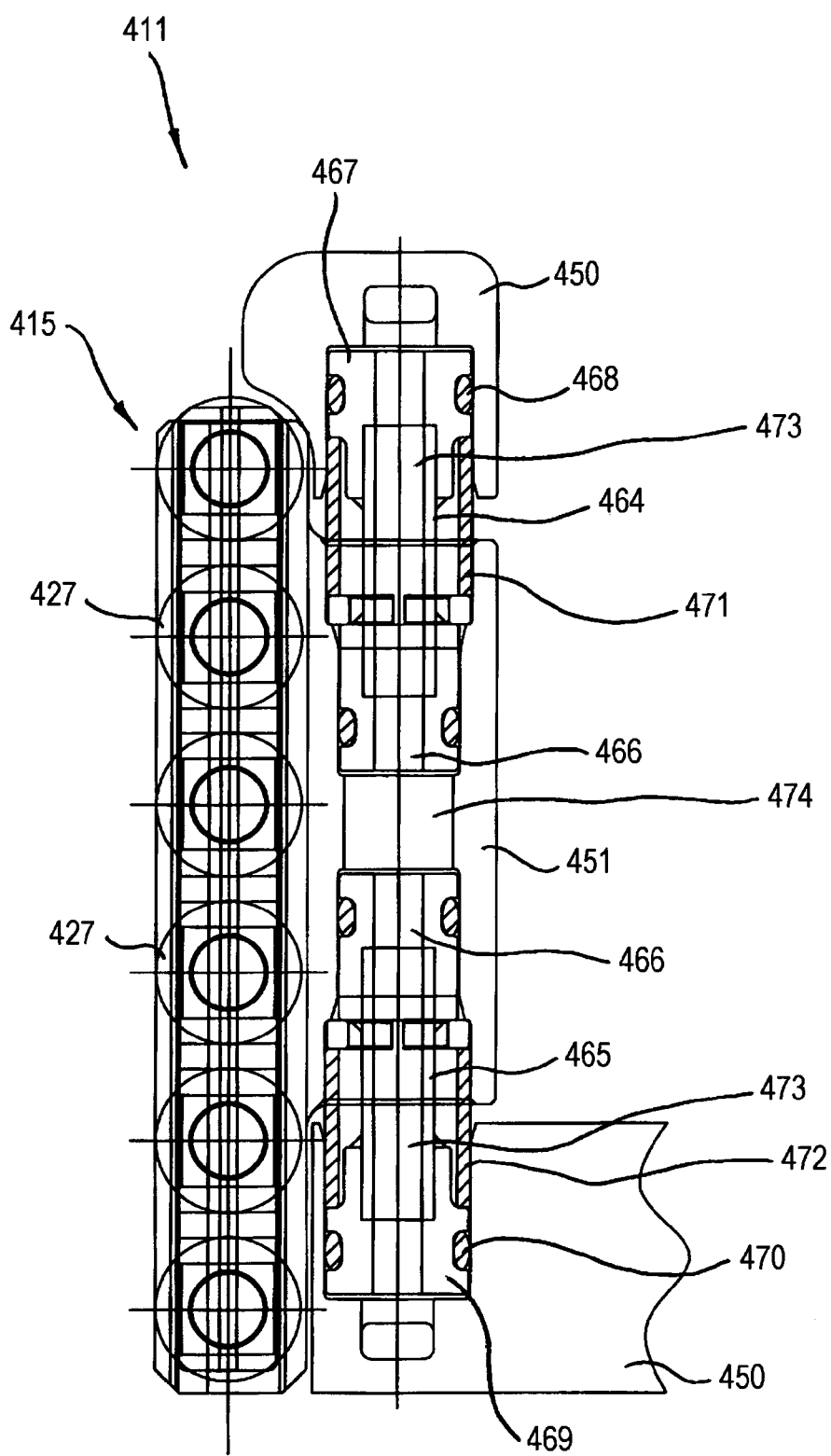
FIG. 30 is a fragmentary section taken along a longitudinal plane of the upper element in FIG. 24.

Further, each supporting element 451 is connected to the body 450 so as to be able to move with respect to the body 450. For example, as shown in FIG. 30, the supporting element 451 can be connected to the body 450 by means of a first tubular body 464, provided in an upper zone of the supporting element 451, and a second tubular body 465, provided in a lower zone of the supporting element 451. The first tubular body 464 and the second tubular body 465 are made of an elastically deformable material.

The first tubular body 464 and the second tubular body 465 are internally provided with conduit portions 473 connected to a hollow internal zone 474 of the supporting element 451 to define a conduit arrangement 466 through which a cooling fluid passes.

The first tubular body 464 and the second tubular body 465 enable the supporting element 451 to rotate with respect to the body 450.

The first tubular body 464 is provided, at one end, with a head 467 that carries a gasket 468. The second tubular body 465 is provided, at one end, with a further head 469 that carries a further gasket 470. The gasket 468 and the further gasket 470 prevent the cooling fluid exiting the conduit arrangement 466.

There are further provided a first tubular element 471 that surrounds, at least partially, the first tubular body 464 and a second tubular element 472 that surrounds, at least partially, the second tubular body 465.

The first tubular element 471 and the second tubular element 472 are made of an elastically deformable material.

In particular, the material with which the first tubular body 464 and the second tubular body 465 are made is more deformable than the material with which the first tubular element 471 and the second tubular element 472 are made.

The first tubular element 471 and the second tubular element 472 connect in a non-stiff manner the supporting elements 451 to the body 450. The first tubular element 471 and the second tubular element 472—and thus the supporting element 451—can perform movements of limited amount with respect to the body 450.

Each supporting element 451 is movable with respect to the body 450 independently of the other supporting elements 451.

During operation, when a dose D interacts with the rolling arrangement 415 rotatably supported by the supporting elements 451, the supporting elements 451 can oscillate and move with respect to the body 450 to enable the blow between the dose D and the rolling arrangement 415 to be cushioned. The possibility of absorbing at least partially the impact between the dose D and the rolling arrangement 415 enables the manner of descent of the dose D along the upper element 411 to be improved and stabilized. If it is not possible to cushion the impact between the dose D and the rolling arrangement 415, in fact, the dose D, especially when the apparatus 1 operates at high speed, i.e. so as to obtain high productivity, tends to tilt in a direction opposite the direction of the impact.

Each supporting element 451 comprises a pair with grooves 453 arranged for receiving rack elements 454 that support the rolling arrangement 415.

The grooves 453 are arranged substantially parallel to a longitudinal axis of the upper element 411.

Alternatively, the grooves 453 can be tilted with respect to the longitudinal axis of the upper element 411, for example by an angle comprised between 15° and 30°.

The supporting element 451 has a triangular plan shape, the grooves 453 being positioned at two vertexes of the triangle and a hole 459—arranged for receiving the first tubular body 464 and the second tubular body 465—being positioned at a further vertex of the triangle.

The rolling arrangement 415 comprises a plurality of rollers 427.

The rollers 427 define a plurality of rows aligned along the longitudinal axis of the upper element 411.

Each roller 427 comprises, at opposite ends 455 thereof, seats 456 arranged for receiving balls 460 that rotatably connect the rollers 427 to the rack elements 454, as will be disclosed in greater detail below.

Each rack element 454 comprises a plurality of projecting portions 457 that define cavities 458 each of which is arranged for partially receiving a corresponding ball 460. The ball 460 thus comprises a portion received inside the cavity 458 of the rack element 454 and a further portion received inside the seat 456 of the roller 427.

Figure 28:
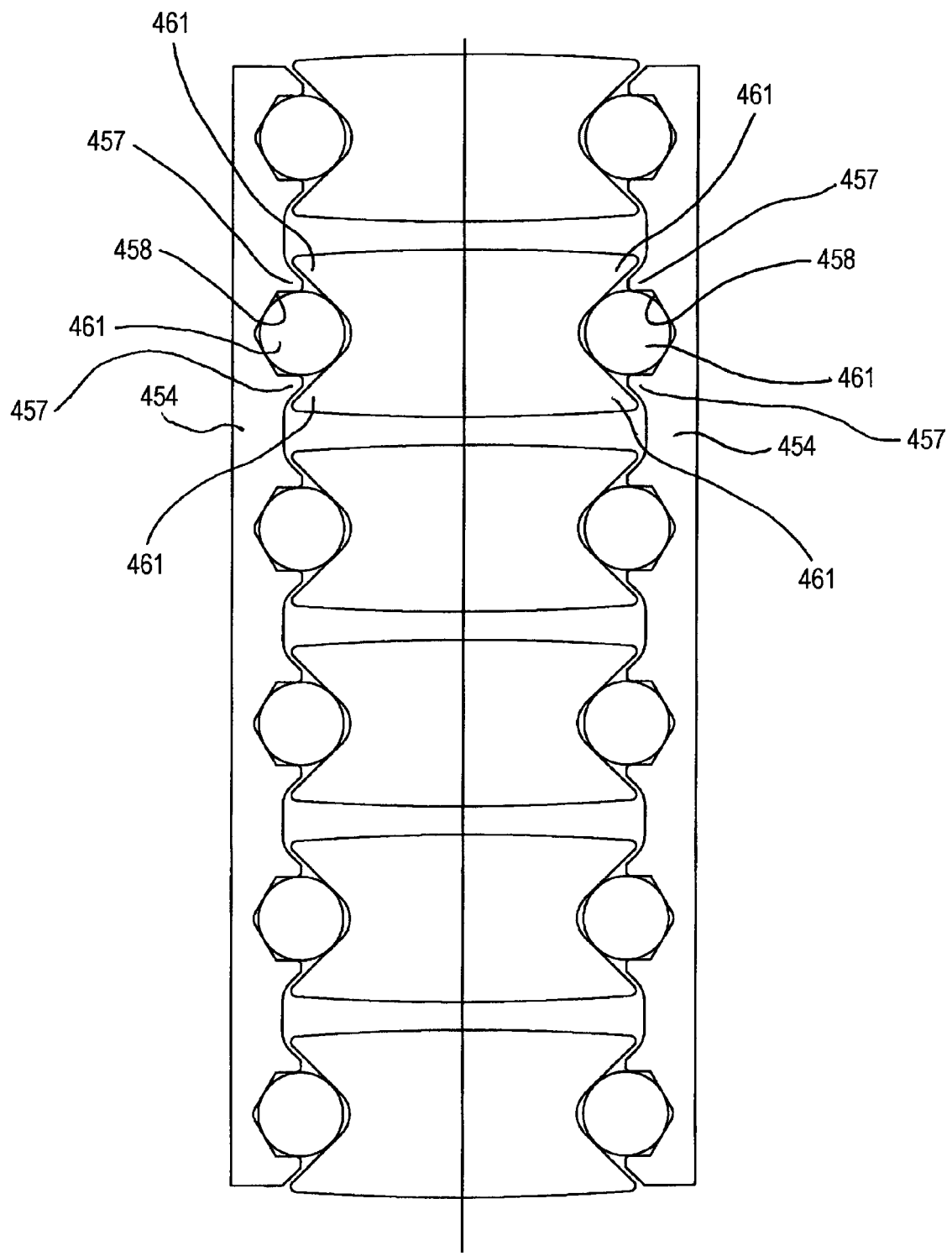
FIG. 28 is a front view of rack elements supporting the rolling arrangement of the upper element in FIG. 24.
Figure 29:
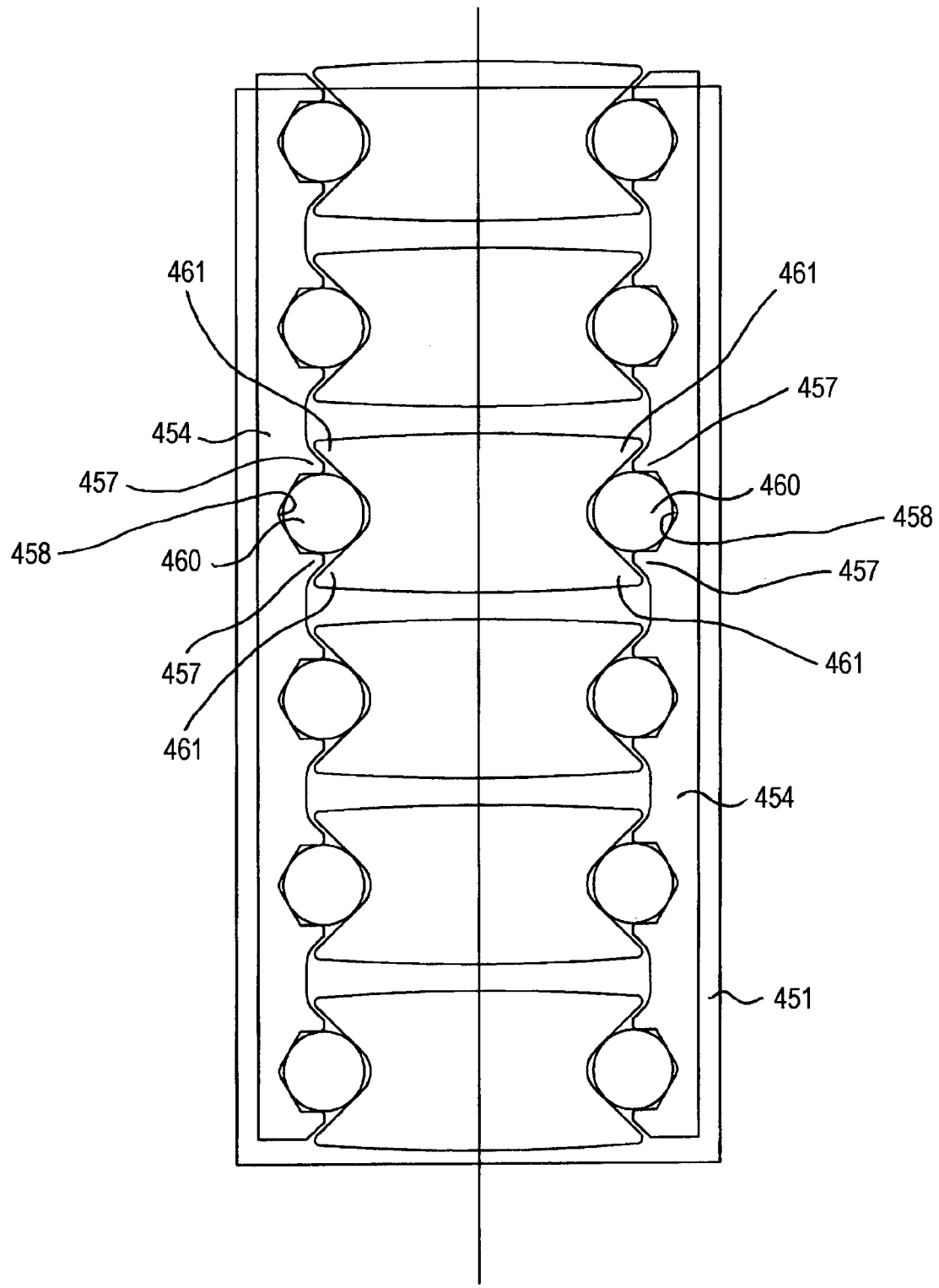
FIG. 29 is a view like the one in FIG. 28 that shows the rack elements associated with a corresponding supporting element.

During mounting, the rollers 427 are positioned between two rack elements 454 so as to be rotatably supported by the rack elements 454 by the balls 460, as shown in FIG. 28. Subsequently, the preassembled unit consisting of the two rack elements 454—and of the rollers 427 and of the balls 460 supported thereby—is inserted into the interior of the body 450 such that the two rack elements 454 are received substantially simultaneously in the grooves 453, each groove 453 housing a corresponding rack element 454, as shown in FIG. 29.

The supporting element 451 is so shaped that the grooves 453 are mutually facing and are separated by a distance that is substantially equal to the width of the aforesaid preassembled unit, formed by the two rack elements 454, by the rollers 427 and the balls 460 interposed between the rollers 427 and the rack elements 454.

Between the rollers 427 and the balls 460 and between the balls 460 and the rack elements 454 friction of rolling type develops, which enables the transfer of the doses D to be made faster.

Further, zones 461 of the rollers 427 that bound the seats 456 and the projecting portions 457 of the rack elements 454 that bound the cavities 458 protect the balls 460 from contact with dirt and deposits of materials of various types that would cause friction to increase.

The body 450 is crossed by conduits 463 through which a cooling fluid circulates. The conduits 463 are connected to the conduit arrangement 466 that extend vertically along the supporting elements 451.

The conduits 463 cooperate with the conduit arrangement 466 to form a closed temperature conditioning circuit.

During operation, when the further carousel 9 is rotated, the transferring units 10 interact with the air in the environment in which the transferring device 7 is installed. The aforesaid air passes through the gaps defined between the rollers 427 and strikes the side wall 417. In an embodiment, as the side wall 17 is continuous—i.e. does not have openings that allow the passage of the aforesaid air—the aforesaid air is induced, after striking the side wall 417 and being cooled by the fluid that flows in the conduits 463 and in the conduit arrangement 466, to return to the rollers 427. In this manner, the rollers 427 are cooled. In addition, a cushion of air is defined—at low temperature—that limits adhesion of the doses D to the rollers 427.

Figure 26:
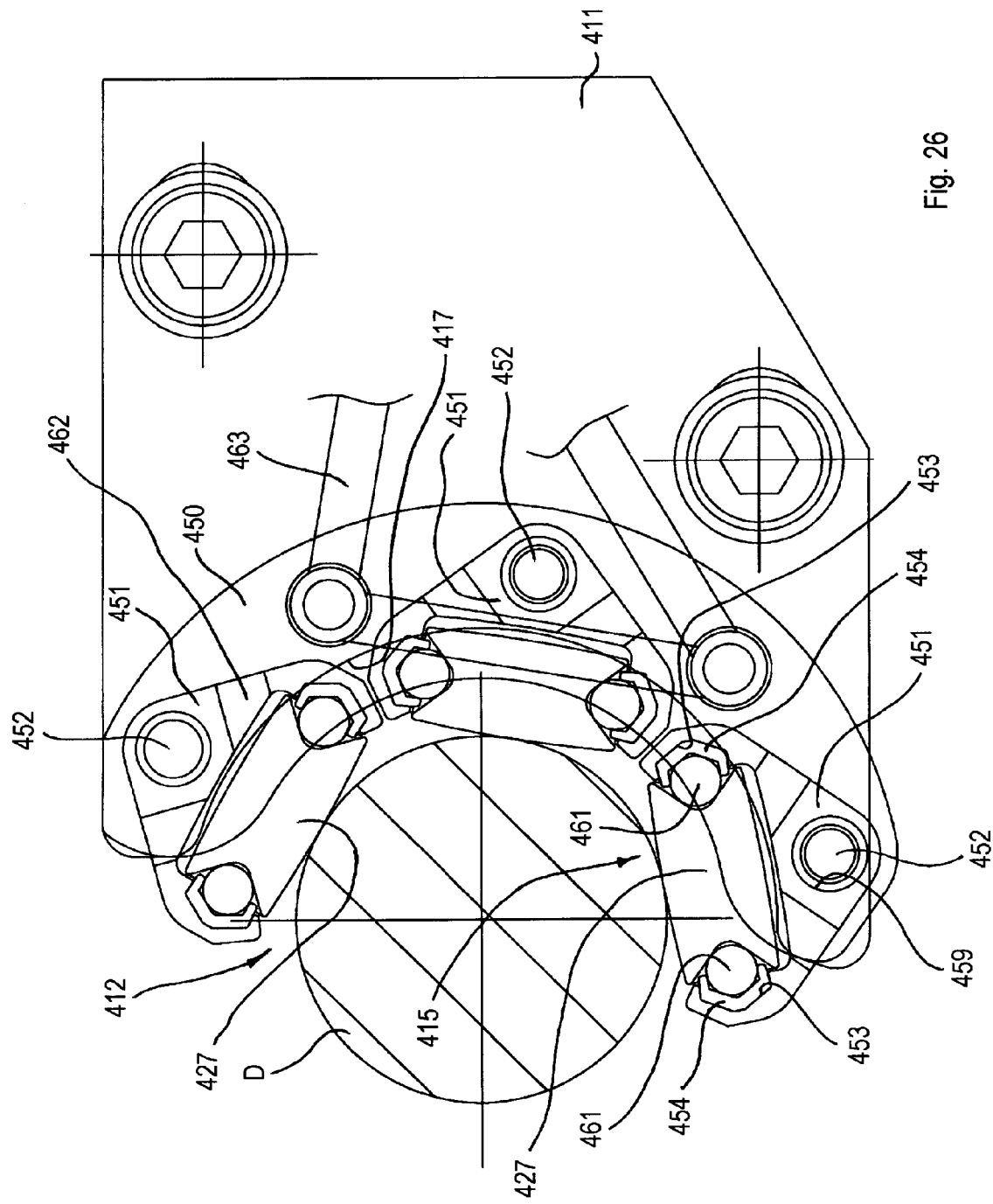
FIG. 26 is a cross section of the upper element in FIG. 24.
Figure 27:
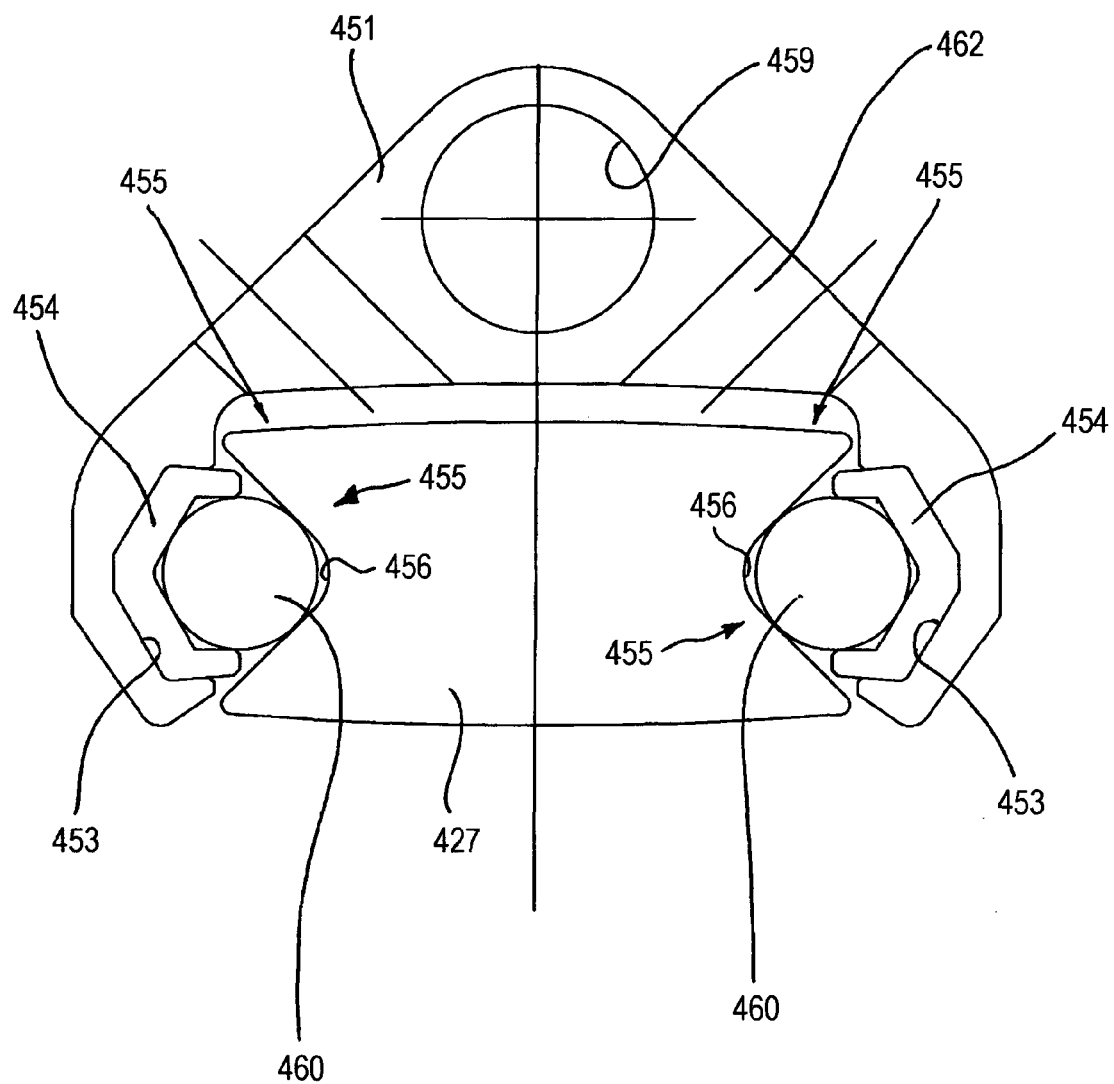
FIG. 27 is a plan view of a supporting element with which the upper element in FIG. 24, is provided.

Alternatively, as shown in FIGS. 26 and 27, the supporting elements 451 can be provided with openings 462 that enable air to be evacuated to a rear zone of the supporting elements 451.

The rollers 427 can be made of the materials with which the rollers 27, the rollers 127 and the rollers 227 disclosed with reference to FIGS. 16 to 23 are made. Further, the rollers 427 may have shapes and surface finishes like those of the rollers 27, of the rollers 127 and of the rollers 227 disclosed with reference to FIGS. 16 to 23.

In order to make the rollers, different materials can also be used, for example materials the composition and nature of which have great water repellence, i.e. great repellence to plastics.

Figure 31:
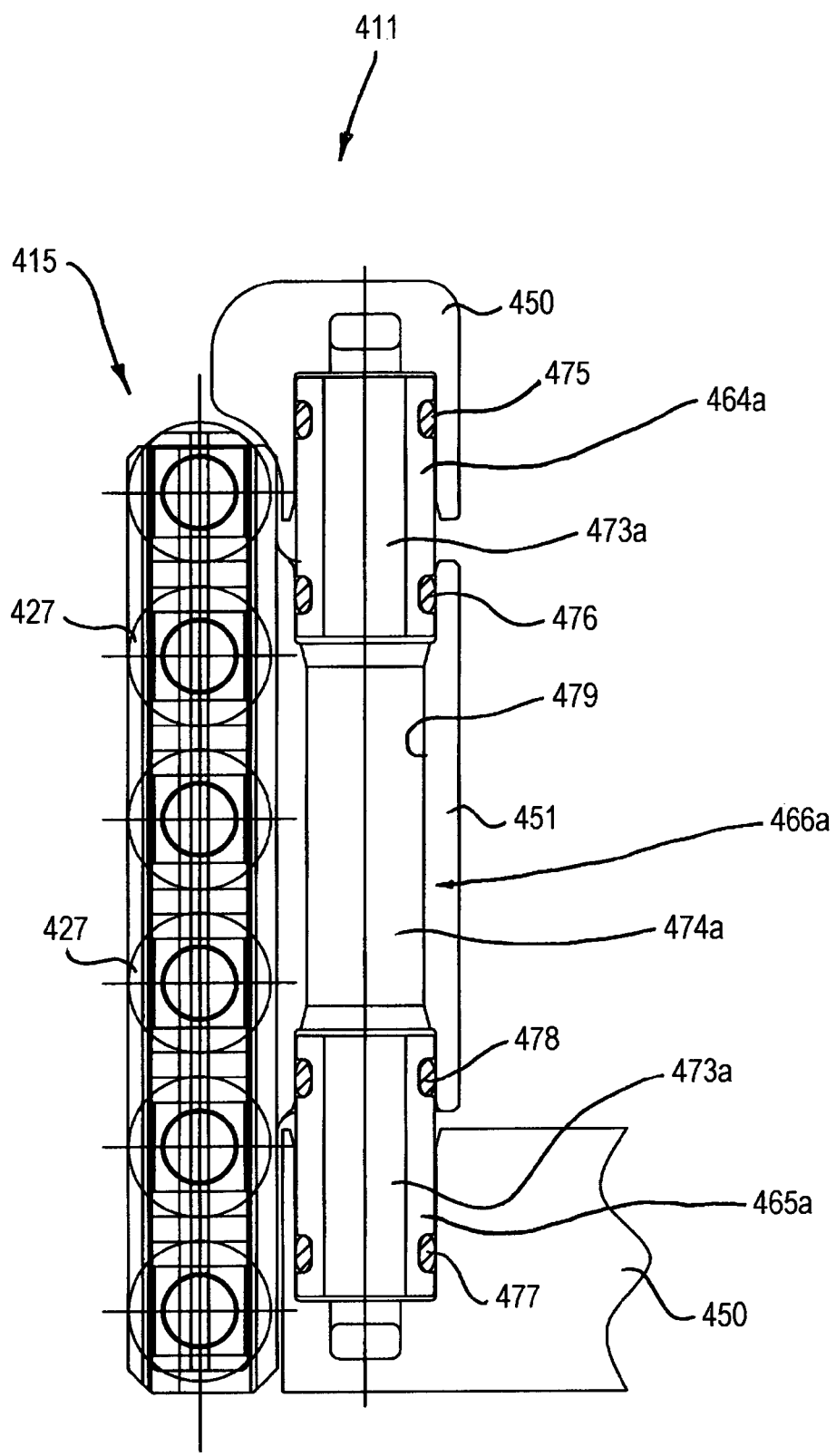
FIG. 31 is a section like the one in FIG. 30 that shows a version of the upper element.

With reference to FIG. 31, there is shown an upper element 411 made according to a version in which the supporting element 451 is connected to the body 450 by means of a first tubular body 464a, provided in an upper zone of the supporting element 451, and a second tubular body 465a, provided in a lower zone of the supporting element 451.

The first tubular body 464a and the second tubular body 465a are internally provided with conduit portions 473a connected to a hollow internal zone 474a of the supporting element 451 to define a conduit arrangement 466a through which a cooling fluid passes.

Between the first tubular body 464a and the body 450 there is interposed a first sealing element 475 and between the first tubular body 464a and the supporting element 451 there is interposed a second sealing element 476.

Similarly, between the second tubular body 465a and the body 450 there is interposed a further first sealing element 477 and between the second tubular body 465a and the supporting element 451 there is interposed a further second sealing element 478.

The first sealing element 475, the second sealing element 476, the further first sealing element 477 and the further second sealing element 478 prevent the cooling fluid leaving the conduit arrangement 466a.

The first tubular body 464a and the second tubular body 465a are made in a material having great thermal conductivity.

The conduit portions 473a obtained in the first tubular body 464a and in the second tubular body 465a have sections that are greater than those of the conduit portions 473 obtained in the first tubular body 464 and in the second tubular body 465 shown in FIG. 30, so as to allow the passage of a greater flow rate of cooling fluid.

Further, the first tubular body 464a and the second tubular body 465a have shorter lengths than those of the conduit portions 473 obtained in the first tubular body 464 and in the second tubular body 465 shown in FIG. 30. In this manner, the hollow internal zone 474a is larger than the hollow zone 474 shown in FIG. 30. Cooling efficacy is thus improved inasmuch as the hollow zone 474a is bounded by a wall 479 intended for interacting with the cooling fluid having a very wide extent.

It is possible to use the embodiment of the upper element 411 shown in FIG. 31 in cases in which the possibility of having more effective cooling is preferred to the possibility of cushioning the blows of the doses D against the upper element 411.

Figure 32:
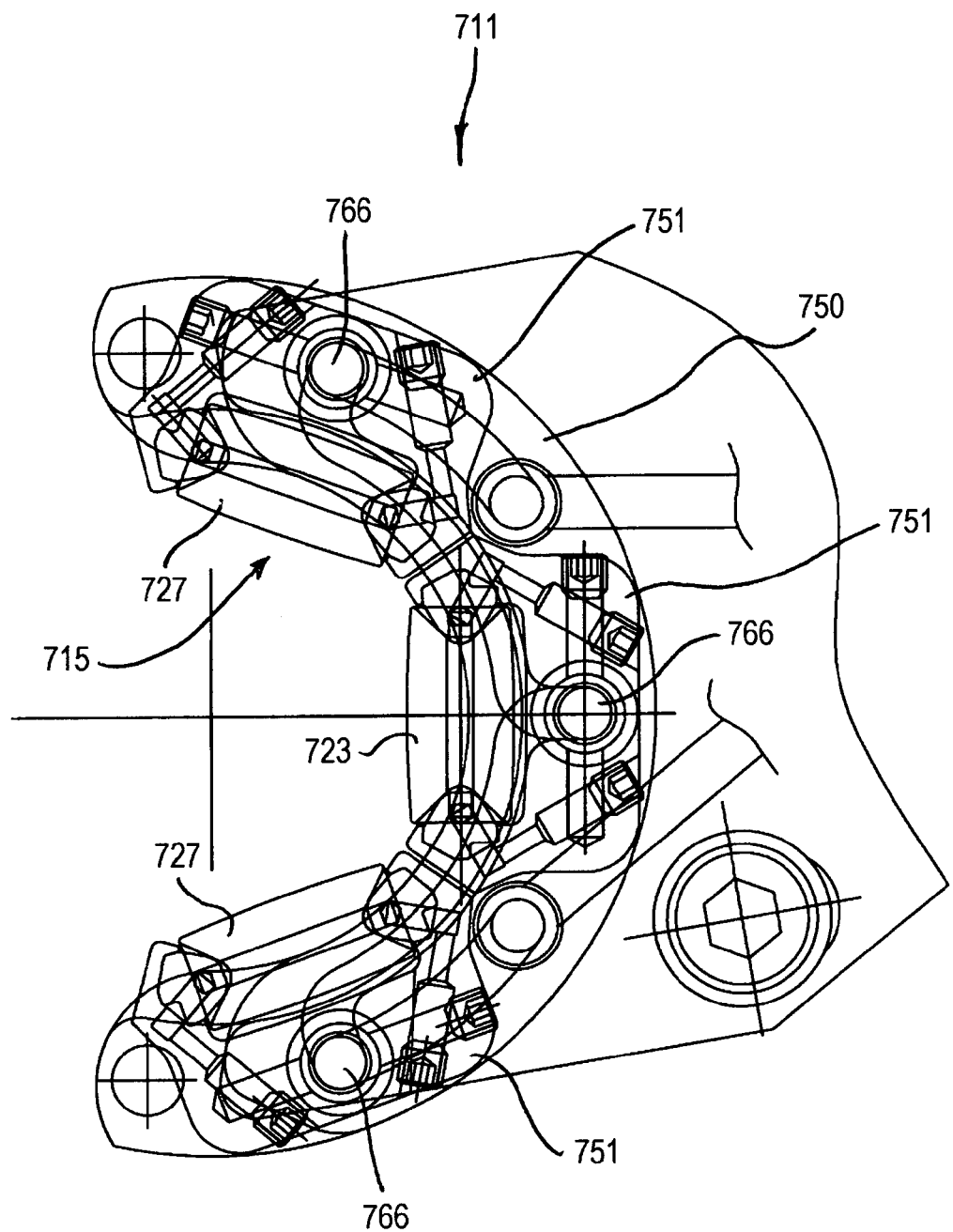
FIG. 32 is a cross section of an upper element made according to a further version.
Figure 33:
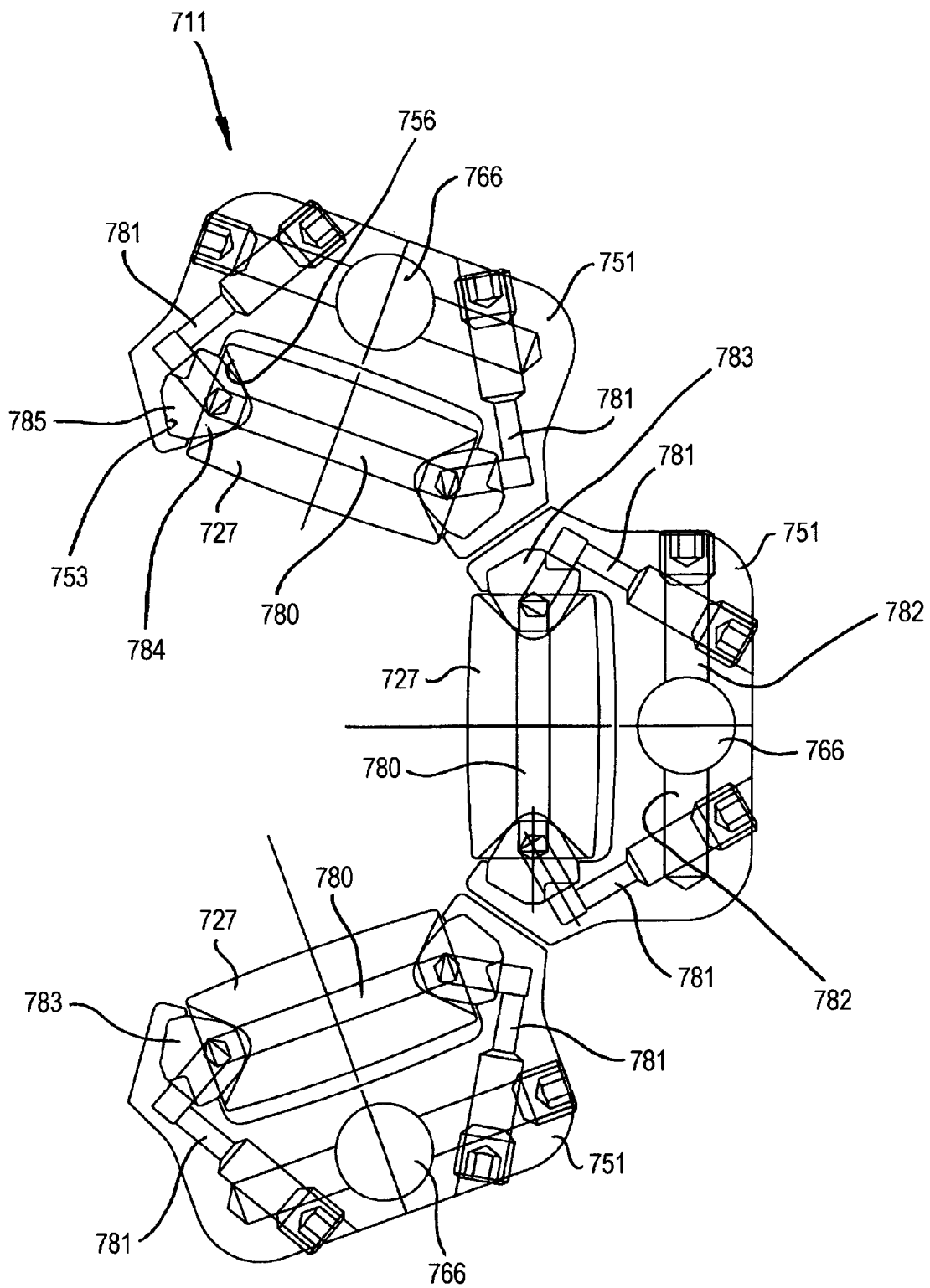
FIG. 33 is a section like the one in FIG. 32 in which some parts of the upper element have been eliminated to facilitate comprehension.

With reference to FIGS. 32 and 33 there is shown an upper element 711 provided with a rolling arrangement 715 that comprises rollers 727 rotatably supported by supporting elements 751 connected to a body 750, similarly to what is described with reference to the upper element 411 shown in FIGS. 24 to 31.

The rollers 727 are made of a porous material. In particular the rollers 727 can be made of porous polytetrafluorethylene (PTFE). The porous polytetrafluorethylene (PTFE) has a low friction coefficient and, therefore, the tendency of the plastics that form the doses D to adhere to the rollers 727 is reduced.

The rollers 727 are internally provided with a cavity 780 that communicates with conduits 781 arranged for supplying a cooling fluid. A conduit arrangement 766 that passes through the supporting elements 751 is connected to the conduits 781 by further conduits 782. The conduit arrangement 766 extends longitudinally in the supporting elements 751 and is shaped similarly to the conduit arrangement disclosed with reference to FIG. 30 and to the conduit arrangement 466a disclosed with reference to FIG. 31.

The cooling fluid can be a pressurised fluid, in particular pressurised air.

The cooling fluid exits the cavity 780 through the pores of the porous material.

The cooling fluid cools the rollers 727 and the plastics that form the doses D, thereby limiting the adhesion of the plastics to the rollers 727.

If the cooling fluid is a pressurised cooling fluid, the pressurised cooling fluid, when it exits the pores of the porous material, expands, decreasing the temperature thereof. This enables more effective cooling to be obtained. The cooling fluid that exits the pores of the porous material forms a cushion of fluid that further prevents the adhesion of the plastics to the rollers 727 and cushions the blows between the doses D and the rollers 727.

The rollers 727 are rotatably supported on the supporting elements 751 by a rotation promoting element 783, each of which comprises a first portion 784 received in a seat 756 with which the rollers 727 are provided and a second portion 785 received in a groove 753 of the supporting elements 751.

The groove 753 is arranged substantially parallel to a longitudinal axis of the upper element 711.

Alternatively, the groove 753 can be tilted with respect to the longitudinal axis of the upper element 711, for example by an angle comprised between 15° and 30°.

The first portion 784 has a substantially spherical shape. In this manner, between the rollers 727 and the rotation promoting element 783 a rolling friction develops.

The second portion 785 is received in a shapingly coupled manner in the groove 753.

The rotation promoting element 783 is traversed by the conduit arrangement 766.

Also the rollers 27, the rollers 127, the rollers 227 and the rollers 427 disclosed with reference to FIGS. 16 to 31 can be made of porous material.

In addition, also the upper element of the transferring units 10 can be provided with a rolling arrangement made of porous material.

In particular, also the rollers 327 and the rollers 627 disclosed with reference to FIGS. 2 to 15 can be made of porous material.

The invention claimed is:

1. Apparatus comprising a forming arrangement for forming an object from a dose of flowable material and a transferring arrangement for transferring said dose to said forming arrangement, said forming arrangement comprising a compression-moulding device for compression-moulding said object from a dose of plastics, said transferring arrangement having a recess for receiving said dose, wherein in said recess there is provided a rolling arrangement for guiding said dose inside said transferring arrangement, said rolling arrangement comprising a plurality of rolling elements that are rotatable around respective rotation axes arranged transversely to a longitudinal axis of said recess, wherein said rolling elements are arranged around said longitudinal axis so as to form adjacent rows.

2. Apparatus according to claim 1, wherein said longitudinal axis is substantially vertical.

3. Apparatus according to claim 1, wherein said rotation axes are substantially parallel to one another.

4. Apparatus according to claim 1, wherein said rotation axes are substantially orthogonal to said longitudinal axis.

5. Apparatus according to claim 1, wherein said rolling elements comprise rollers.

6. Apparatus according to claim 5, wherein said rollers are bounded by side convex surfaces.

7. Apparatus according to claim 5, wherein said rollers are bounded by substantially cylindrical side surfaces.

8. Apparatus according to claim 5, wherein said rollers are bounded by respective concave side surfaces.

9. Apparatus according to claim 8, wherein said side surfaces are substantially circular.

10. Apparatus according to claim 1, wherein corresponding rolling elements of two adjacent rows are at the same level.

11. Apparatus according to claim 1, wherein said rolling arrangement is made of a material having great thermal conductivity.

12. Apparatus according to claim 1, wherein said rolling arrangement is internally hollow.

13. Apparatus according to claim 1, wherein said rolling arrangement is filled with a cooling substance.

14. Apparatus according to claim 1, wherein said rolling arrangement is made of porous material.

15. Apparatus according to claim 14, wherein said porous material comprises porous polytetrafluorethylene (PTFE).

16. Apparatus according to claim 14, and further comprising a dispensing device arranged for dispensing a fluid through pores of said porous material.

17. Apparatus according to claim 1, wherein said recess comprises a tubular portion that defines a transferring chamber.

18. Apparatus according to claim 17, wherein said rolling arrangement is positioned so as to interact with an intermediate portion and/or tail portion of said dose, whilst a head portion of said dose penetrates into said forming arrangement.

19. Apparatus according to claim 17, wherein said rolling arrangement is positioned at least a zone in which a first contact occurs between said dose and said tubular portion, when said dose enters said transferring arrangement.

20. Apparatus according to claim 17, wherein said rolling arrangement peripherally bounds said tubular portion.

21. Apparatus according to claim 17, wherein said transferring arrangement comprises a tubular element arrangement in which there is defined said tubular portion.

22. Apparatus according to claim 21, wherein said tubular element arrangement comprises a continuous wall arrangement that bounds said tubular portion.

23. Apparatus according to claim 21, wherein said tubular element arrangement comprises a part shaped substantially like an upturned truncated cone and having a cross section that decreases towards said forming arrangement.

24. Apparatus according to claim 21, wherein said tubular element arrangement comprises a further part shaped substantially like a cylinder and having a substantially constant cross section.

25. Apparatus according to claim 24, wherein said tubular element arrangement comprises a part shaped substantially like an upturned truncated cone and having a cross section that decreases towards said forming arrangement, said further part being nearer said forming arrangement of said part.

26. Apparatus according to claim 21, wherein said tubular element arrangement comprises an inlet opening through which said dose is received in said tubular portion and an outlet opening through which said dose exits said tubular portion.

27. Apparatus according to claim 21, wherein said tubular element arrangement comprises a first tubular element and a second tubular element aligned along a longitudinal axis of said tubular portion.

28. Apparatus according to claim 27, and further comprising a supporting element that rotatably supports said rolling arrangement.

29. Apparatus according to claim 28, wherein said supporting element is interposed between said first tubular element and said second tubular element.

30. Apparatus according to claim 28, wherein said supporting element comprises a cavity arrangement arranged for receiving said rolling arrangement.

31. Apparatus according to claim 30, wherein said cavity arrangement is shaped so that said rolling arrangement projects partially outside said cavity.

32. Apparatus according to claim 30, wherein said cavity arrangement comprises grooves arranged for receiving pins of said rolling arrangement, such that each rolling element of said rolling arrangement is rotatable with respect to said supporting element.

33. Apparatus according to claim 27, wherein said second tubular element comprises a cavity arrangement arranged for receiving said rolling arrangement.

34. Apparatus according to claim 33, wherein said cavity arrangement is shaped so that said rolling arrangement projects partially outside said cavity arrangement.

35. Apparatus according to claim 33, wherein said cavity arrangement comprises grooves arranged for receiving pins of said rolling arrangement, such that said rolling arrangement is rotatable with respect to said second tubular element.

36. Apparatus according to claim 33, wherein said first tubular element is shaped so as to close said cavity arrangement to prevent said rolling arrangement from disengaging from said cavity arrangement when said first tubular element and said second tubular element are mutually connected.

37. Apparatus according to claim 21, wherein said rolling arrangement comprises five rolling elements having rotation axes positioned so as to define a pentagon.

38. Apparatus according to claim 21, wherein said rolling arrangement comprises four rolling elements having rotation axes positioned so as to define a quadrilateral.

39. Apparatus according to claim 21, wherein said rolling arrangement comprises three rolling elements having rotation axes positioned so as to define a triangle.

40. Apparatus according to claim 17, and further comprising a tubular body in which there is defined said tubular portion.

41. Apparatus according to claim 40, and further comprising a rack arrangement that rotatably supports said rolling arrangement.

42. Apparatus according to claim 41, wherein said tubular body comprises grooves each groove being arranged for receiving a rack of said rack arrangement.

43. Apparatus according to claim 42, wherein each groove of said grooves is arranged substantially parallel to a longitudinal axis of said tubular portion.

44. Apparatus according to claim 41, and further comprising a ball arrangement, each ball of said ball arrangement being interposed between a rolling element of said rolling arrangement and a rack of said rack arrangement to rotatably connect said rolling element to said rack.

45. Apparatus according to claim 44, wherein said rolling arrangement comprises a seat arrangement arranged for partially receiving said ball arrangement.

46. Apparatus according to claims 44, wherein each rack of said rack arrangement comprises a first cavity arrangement arranged for partially receiving first balls of said ball arrangement and a second cavity arrangement arranged for partially receiving second balls of said ball arrangement.

47. Apparatus according to claim 40, wherein said rolling arrangement entirely occupies an internal wall of said tubular portion.

48. Apparatus according to claim 40, wherein said rolling arrangement comprises six rows of rolling elements, the rotation axes of six rolling elements each belonging to a corresponding row and arranged at the same level so as to define a hexagon.

49. Apparatus according to claim 1, wherein said recess comprises a laterally open portion.

50. Apparatus according to claim 49, wherein said recess comprises a tubular portion that defines a transferring chamber, said laterally open portion being arranged upstream of said tubular portion and being shaped so as to deliver said dose to said tubular portion.

51. Apparatus according to claim 49, wherein said rolling arrangement peripherally bounds at least a part of said laterally open portion.

52. Apparatus according to claim 49, wherein said laterally open portion is bounded by a wall element extending along a longitudinal axis of said laterally open portion.

53. Apparatus according to claim 52, wherein said laterally open portion has a "U" or "C" or "J"-shaped cross section so as to define an open channel on a side that extends along said longitudinal axis.

54. Apparatus according to claim 52, wherein said wall element has a lateral opening through which said dose can enter said laterally open portion.

55. Apparatus according to claim 49, wherein said transferring arrangement comprises a supporting structure supporting said rolling arrangement.

56. Apparatus according to claim 55, wherein said supporting structure comprises a concave part inside which there is defined said laterally open portion.

57. Apparatus according to claim 56, wherein said concave part has at least an opening through which rolling elements of said rolling arrangement project towards said laterally open portion.

58. Apparatus according to claim 57, wherein said at least an opening has dimensions such as to house a group of said rolling elements.

59. Apparatus according to claim 57, and comprising a locking arrangement to prevent said rolling elements disengaging from said at least an opening.

60. Apparatus according to claim 59, wherein said locking arrangement comprises at least a locking element inserted into the thickness of said concave part.

61. Apparatus according to claim 59, wherein said locking arrangement comprises at least a locking element mounted outside said concave part.

62. Apparatus according to claim 60, wherein said at least a locking element is shaped like a rack.

63. Apparatus according to claim 45, wherein each rolling element of said rolling arrangement is provided with end pins suitable for being received in a corresponding seat of said seat arrangement to enable said rolling element to rotate.

64. Apparatus according to claim 63, wherein said supporting structure comprises a concave part inside which there is defined said laterally open portion, said seat arrangement being obtained in said concave part.

65. Apparatus according to claim 63, wherein said concave part has at least an opening through which rolling elements of said rolling arrangement project towards said laterally open portion, said apparatus comprising a locking arrangement to prevent said rolling elements disengaging from said at least an opening and said seat arrangement being obtained in said locking arrangement.

66. Apparatus according to claim 56, wherein said supporting structure comprises a substantially flat part arranged transversely to said concave part.

67. Apparatus according to claim 55, wherein said supporting structure is made of a material having great thermal conductivity.

68. Apparatus according to claim 49, and further comprising a body in which there is defined said laterally open portion.

69. Apparatus according to claim 68, wherein to said body there is connected a supporting arrangement arranged for rotatably supporting said rolling arrangement.

70. Apparatus according to claim 69, wherein said supporting arrangement comprises a plurality of supporting elements placed alongside one another.

71. Apparatus according to claim 69, wherein said supporting arrangement is rotatably supported by said body.

72. Apparatus according to claim 71, wherein said supporting arrangement is hinged on said body by a tubular arrangement, said tubular arrangement being internally provided with a conduit arrangement arranged for being passed through by a cooling fluid.

73. Apparatus according to claim 69, wherein between said supporting arrangement and said body there is interposed a yielding element that enables said supporting arrangement to move with respect to said body so as to cushion blows between said dose and said supporting arrangement.

74. Apparatus according to claim 68, and further comprising a rack arrangement that rotatably supports said rolling arrangement.

75. Apparatus according to claim 74, wherein to said body there is connected a supporting arrangement arranged for rotatably supporting said rolling arrangement, said supporting arrangement comprising grooves each groove being arranged for receiving a rack of said rack arrangement.

76. Apparatus according to claim 75, wherein each groove of said grooves is arranged substantially parallel to a longitudinal axis of said laterally open portion.

77. Apparatus according to claim 75, wherein each groove of said grooves is tilted with respect to a longitudinal axis of said laterally open portion by an angle comprised between 15° and 30°.

78. Apparatus according to claim 74, and further comprising a ball arrangement, each ball of said ball arrangement being interposed between a rolling element of said rolling arrangement and a rack of said rack arrangement to rotatably connect said rolling element to said rack.

79. Apparatus according to claim 78, wherein said rolling arrangement comprises a seat arrangement arranged for partially receiving said ball arrangement.

80. Apparatus according to claim 78, wherein said rack arrangement comprises a cavity arrangement arranged for partially receiving said ball arrangement.

81. Apparatus according to claim 69, and further comprising a rotation promoting element interposed between a rolling element of said rolling arrangement and a supporting element of said supporting arrangement to rotatably connect said rolling element of said rolling arrangement to said supporting element of said supporting arrangement.

82. Apparatus according to claim 81, wherein said rotation promoting element comprises a first portion received in a seat of said seat arrangement of a rolling element of said rolling arrangement and a second portion received in a groove of said grooves of a supporting element of said supporting arrangement.

83. Apparatus according to claim 82, wherein each groove of said grooves is arranged substantially parallel to a longitudinal axis of said laterally open portion.

84. Apparatus according to claim 82, wherein each groove of said grooves is tilted with respect to a longitudinal axis of said laterally open portion by an angle comprised between 15° and 30°.

85. Apparatus according to claim 82, wherein said first portion has a substantially spherical shape.

86. Apparatus according to claim 82, wherein said second portion is received in a groove of said grooves.

87. Apparatus according to claim 68, wherein said rolling arrangement entirely occupies an internal wall of said laterally open portion.

88. Apparatus according to claim 1, and further comprising a cooling arrangement for cooling said transferring arrangement.

89. Apparatus according to claim 1, and further comprising a dispensing device for dispensing a pressurised fluid at an end of said transferring arrangement, so as to push said dose towards a further end of said transferring arrangement, said further end being opposite said end.

90. Apparatus according to claim 1, wherein said transferring arrangement comprises a plurality of transferring units that is movable along a closed path.

91. Apparatus according to claim 1, wherein said compression-molding device comprises a plurality of molding units mounted on a rotatable carousel.

92. Apparatus according to claim 1, wherein said forming arrangement is shaped so as to obtain from said dose a container preform.

93. Apparatus according to claim 1, and comprising an extruding device for extruding said flowable material.

* * * * *